(12) United States Patent
Lee et al.

(10) Patent No.: US 11,378,546 B2
(45) Date of Patent: Jul. 5, 2022

(54) PH METER

(71) Applicant: Parker-Hannifin Corporation, Cleveland, OH (US)

(72) Inventors: Eric Lee, Acton, MA (US); Steve Roth, San Jose, CA (US); Thang Huy Vu, San Jose, CA (US)

(*) Notice: Subject to any disclaimer, the term of this patent is extended or adjusted under 35 U.S.C. 154(b) by 0 days.

(21) Appl. No.: 16/667,693

(22) Filed: Oct. 29, 2019

(65) Prior Publication Data
US 2020/0064307 A1 Feb. 27, 2020

Related U.S. Application Data

(63) Continuation of application No. 14/758,491, filed as application No. PCT/US2013/078018 on Dec. 27, 2013, now abandoned.

(60) Provisional application No. 61/746,479, filed on Dec. 27, 2012.

(51) Int. Cl.
*G01N 27/416* (2006.01)
*G01N 27/30* (2006.01)
*G01N 27/36* (2006.01)

(52) U.S. Cl.
CPC ....... *G01N 27/4167* (2013.01); *G01N 27/301* (2013.01); *G01N 27/4165* (2013.01); *G01N 27/36* (2013.01)

(58) Field of Classification Search
CPC .......... G01N 27/4167; G01N 27/4165; G01N 27/301; G01N 27/36; G01N 27/302; G01N 33/0004–0075
See application file for complete search history.

(56) References Cited

U.S. PATENT DOCUMENTS

| | | | |
|---|---|---|---|
| 4,226,784 A | 10/1980 | Kalopissis | |
| 5,141,868 A | 8/1992 | Shanks | |
| 6,999,810 B2 | 2/2006 | Berner et al. | |
| 7,208,077 B1 | 4/2007 | Albers et al. | |
| 9,417,204 B2 | 8/2016 | Lee | |
| 2002/0185385 A1 | 12/2002 | Charlton | |
| 2003/0134924 A1* | 7/2003 | Cyr | C09B 69/101 522/26 |
| 2005/0000803 A1 | 1/2005 | Ritter et al. | |
| 2007/0209935 A1 | 9/2007 | Vogel et al. | |
| 2008/0061792 A1 | 3/2008 | Hsiung et al. | |

(Continued)

FOREIGN PATENT DOCUMENTS

| | | |
|---|---|---|
| DE | 102007050477 | 4/2009 |
| JP | 62-112046 | 5/1987 |

(Continued)

OTHER PUBLICATIONS

Zuo et al. (S Auo, Y Teng, H Yuan, M Lan, Direct electrochemistry of glucose oxidase on scree-priunted electrodes through one-step enzyme immobilization process with silica sol-gel/polyvinyl alcohol hybrid film, Sensors and Actuators B 133 (2008) 555-560). (Year: 2008).*

(Continued)

*Primary Examiner* — Joshua L Allen
(74) *Attorney, Agent, or Firm* — David R. Conklin; Kirton McConkie

(57) ABSTRACT

Voltammetric sensors prepared from composite materials and optionally using microfabrication techniques enable detection of analyte in sample volumes under ten microliters.

14 Claims, 11 Drawing Sheets

(56) References Cited

U.S. PATENT DOCUMENTS

| | | | |
|---|---|---|---|
| 2008/0302660 A1* | 12/2008 | Kahn | C12M 41/32 204/416 |
| 2009/0236237 A1 | 9/2009 | Shinno et al. | |
| 2012/0018632 A1 | 2/2012 | Lee | |
| 2012/0187000 A1* | 7/2012 | Kahn | G01N 27/3335 205/782 |
| 2013/0256133 A1* | 10/2013 | Lawrence | G01N 27/4167 204/412 |
| 2014/0332411 A1* | 11/2014 | Lawrence | G01N 27/302 205/782.5 |
| 2014/0332413 A1* | 11/2014 | Crawford | C01B 32/194 205/787.5 |

FOREIGN PATENT DOCUMENTS

| | | |
|---|---|---|
| JP | 64-012259 | 1/1989 |
| JP | 1-263550 | 10/1989 |
| JP | 7-3180 | 1/1995 |
| JP | 9-105708 | 4/1997 |
| JP | 09-127039 | 5/1997 |
| JP | 10-325821 | 12/1998 |
| JP | 11-304666 | 11/1999 |
| JP | 2003-104930 | 4/2003 |
| JP | 2004-532833 | 10/2004 |
| JP | 2006-266795 | 10/2006 |
| JP | 2007268289 | 10/2007 |
| JP | 2009-85797 | 4/2009 |
| JP | 2012-178335 | 9/2012 |
| JP | 2012-520462 | 9/2012 |
| JP | 2012-522223 | 9/2012 |
| WO | WO 86/00138 | 1/1986 |
| WO | WO 2004-034053 | 4/2004 |
| WO | WO 2008/033419 | 3/2008 |
| WO | WO 2009/060849 | 5/2009 |
| WO | WO-2010104962 A1 * | 9/2010 ............ G01N 27/302 |
| WO | WO-2010111531 A9 * | 8/2011 ............ G01N 27/302 |
| WO | WO 2012/018632 | 2/2012 |

OTHER PUBLICATIONS

Cicmil et al. (D. Cicmil, S. Anastasova, A. Kavanagh, D. Diamond, U. Mattinen, J. Bobacka, A. Lewenstam, A. Radu, Ionic liquid-based, liquid-junction-free reference electrode, Electroanalysis, 23(8) (2011) 1881-1890). (Year: 2011).*

Ramakrishnappa et al. (T Ramakrishnappa, M Pandurangappa, DH Nagaraju, Anthraquinone functionalized carbon composite electrode: application to ammonia sensing, Sensors and Actuators B 155 (2011) 626-631) (Year: 2011).*

Khan 1 (MI Khan, K Mukherjee, R Shoukat, H Dong, A review on pH sensitive materials for sensors and detection methods, Microsyst Technol 23 (2017) 4391-4404) (Year: 2017).*

Pirzada, et al.—"Hybrid Silica-PVA Nanofibers via Sol-Gel Electrospinning", Langmuir, Mar. 6, 2012, pp. 5834-5844, vol. 28—Issue 13.

* cited by examiner

Example of Silver/Silver Chloride Reference Electrode

PH METER

RELATED APPLICATIONS

This application is a continuation of U.S. patent application Ser. No. 14/758,491, filed Jun. 29, 2015, which is the National Stage of International Application No. PCT/US2013/078018, filed Dec. 27, 2013, which claims the benefit of U.S. Provisional Application No. 61/746,479, filed Dec. 27, 2012. This application claims priority to and incorporates herein by reference the above-referenced application in its entirety.

BACKGROUND OF THE INVENTION

Field of the Invention

The present invention provides improved analyte sensors that enable precise measurement of analyte concentrations, including but not limited to hydronium ion concentration or pH. The invention relates generally to the field of analytical chemistry and specifically to pH measurement technology.

Description of Related Disclosures

Measurement of analyte concentration, such as pH, in samples is constrained by available sample volume. Most commercially available pH electrodes require at least milliliter volume samples. Very few specialized glass probes containing a working electrode (the "sensor"), reference electrode, and counter electrodes are available that are advertised as capable of measuring pH in sample volumes as low as 0.5 microliter, and those are very expensive (e.g. Thermo Scientific Orion 9810 BN). However, glass probes designed for small sample volumes present many challenges.

One challenge is positioning of the probe in the sample. Proper probe placement requires ensuring adequate contact between the glass membrane and the reference junction of the probe and the sample. The bulbous shape of glass probes makes this challenge especially difficult. Similarly, semi-solid samples, such as from a tissue biopsy, may require larger volumes, relative to that for liquid samples, when using glass electrodes, as the shape of the probe again may lead to inadequate sample contact for semi-solid samples of small volume. Another challenge is the potential for contamination of samples due to transfer of salts or other materials ("mass") from the electrodes in the probe into the sample. As sample volume decreases, the effect of such mass transfer increases for any probe. Another challenge is sample evaporation, as evaporation is relatively greater in low volume samples, and evaporative effects may be difficult to monitor. Loss of sample volume can lead to erroneous results.

More generally, glass probes can only measure one sample at a time. To increase throughput in a system requiring analyte concentration measurement using a glass probe, one must either increase the number of probes used or decrease the average time required for each measurement. As pH measurement using a glass electrode requires that a potentiometric signal reach steady state (as may be defined by algorithms for a given system), decreasing measurement time is inherently a limited approach. Glass probes are relatively expensive to manufacture, however, and, for repeat use, they must be rinsed between samples to reduce the chances for cross contamination, further impeding high sample throughput in pH measurement. Fouling, a source of drift and error, is also particularly problematic with glass probes, because samples containing protein, sugar, or other constituents that interact with the glass can foul the probe. Glass probes require frequent maintenance to eliminate or reduce fouling and ensure accuracy, and frequent re-calibration is also required. These operations increase the risk of damage, which only increases in the small confines necessitated by small volume samples.

Most commercially available pH electrodes feature a glass membrane in the form of an essentially spherical bulb. For "combination electrodes" a reference junction is also provided in the body of the electrode located near the glass membrane. In all cases, all combination electrodes must be immersed to a depth sufficient to cover the reference junction, which cannot be located co-planar to the glass membrane except in complex designs. A further limitation arises from the liquid junction of the reference electrode. Proper functioning of the reference electrode depends on fluid communication between the analyte and the internal reference solution through a porous junction such as a frit. Under typical use conditions a small quantity of the internal reference solution is allowed to pass through the porous junction into the analyte. This flow is intended to prevent intrusion of the analyte into the internal reference solution which could cause the reference potential to drift. However, in very small samples, passage of internal reference solution into the analyte changes the composition of the analyte and can negatively affect the measurement.

The traditional glass pH probe has a working electrode (WE) that is an ion-selective electrode made of a fragile, doped glass membrane sensitive to hydrogen ions. The pH-responsive glass membrane is the primary analyte sensing element in this type of probe and so is referred to as the "working" electrode. Hydrogen ions within the sample solution bind to the outside of the glass membrane, thereby causing a change in potential on the interior surface of the membrane. This change in potential is measured against the constant potential of a conventional reference electrode (RE), such as an electrode based on silver/silver chloride. The difference in potential is then correlated to a pH value by plotting the difference on a calibration curve. The calibration curve is created through a multistep process whereby the user plots changes in potential for various known buffer standards. Traditional pH meters are based on this principle.

The RE plays a critical role in the accuracy of the measurement. A highly stable electrode potential is necessary. This is commonly achieved using redox systems in which all active components are maintained at constant concentration. In a typical silver/silver chloride RE a chloridized silver wire is immersed in concentrated potassium chloride (KCl) solution. The KCl solution is in fluid and electric communication with the analyte through a porous frit. This liquid junction gives rise to possible contamination of the internal KCl solution, which would change the electrode potential, resulting in drift of the measurement. Other disadvantages include the propensity to leakage of the internal electrolyte, and clogging due to drying or precipitation inside the liquid junction.

Many attempts have been made to improve the stability of the RE. See, for example, Bakker, Electroanalysis 1999, 11, 788; T Blaz, et al., Analyst, 2005, 130, 637; Kakikuchi et al., Anal. Chem. 2007, 79, 7187; Cicmil et al., Electroanalysis, 2011, 23, 1881; U.S. Pat. No. 7,628,901; U.S. Pat. Appl. 2009/0283404; and Chang, et al., Electroanalysis, 2012, 24. These efforts were directed at providing stable REs for potentiometric measurement systems.

The present invention provides sensors, sensor components, and methods for their fabrication and use, particularly voltammetric or amperometric methods for detecting analyte concentration that not only enable the measurement of analyte concentration in small volume samples but also provide improved performance with all sample volumes.

SUMMARY OF THE INVENTION

In some implementations, the present invention provides sensors with substantially flat sensing surfaces on which all sensing elements are located co-planar to one another. These configurations allow even small volumes of sample to contact all sensing elements, for example in the form of a liquid film captured between the sensing surface and another solid surface. Optionally, the sensing elements may be located on opposite surfaces capturing the liquid. The sample is held by capillary action within the gap formed by the sensor without the use of a sample container. In this way the sample size is no longer dependent on the size of the sensor, but rather by the dimension of the gap formed by the sensor and a complementary surface. As an example, by adjusting the size of the gap formed by a 12-mm diameter flat sensor and another 12-mm diameter cylinder, a uniform liquid film can be formed with a volume of 10 microliters or less. Second, the sensitivity of measurement is not reduced as the sample volume decreases, because sensitivity is primarily a function of the surface area of the sensor and not of the sample volume. Indeed, sensor surface areas substantially larger than that possible with conventional glass probes can be made to allow detection of low analyte concentrations. Thus, some implementations of the current invention provide systems that enable precise containment of small sample volumes, as well as sensors with planar geometries that facilitate formation of small gaps with a complementary solid surface, including arrangements where the sensing elements are located on one or both sides of that defined space.

In some embodiments, the present invention provides devices and methods for measuring the concentration of an analyte in microliter-scale liquid samples (e.g. about 10 μL or less) in which the sample is held by surface tension between two anvils, each comprising a containment area where the sample is deposited (or contacted). One or both anvils have embedded in them one or more electrodes of the analyte sensor in conductive contact with a surface of the anvil having a containment area wetted by the sample. In some embodiments, the containment area is defined by a surface wetted by the analyte surrounded by a surface not wetted by the analyte, wherein the surface wetted by the analyte comprises the sensing elements. In some embodiments one or more electrodes of the sensor are fabricated by coating or printing the electrode components on a suitable substrate, such substrates including solids, porous, and/or flexible materials.

In some embodiments, the present invention provides devices that enable multi-channel analyte concentration measurements on a plurality of microliter samples, each held by surface tension between two anvil surfaces that form a sensor, wherein a single voltammetric scan is performed across an array of such sensors. In some embodiments, the device for making analyte concentration measurements on a plurality of microliter liquid samples contained by surface tension comprises: means for containing a plurality of microliter samples by surface tension between opposing, proximal-ends of a plurality of sets of anvils, wherein each set of anvils provides a functional sensor, said anvils optionally in a substantially parallel, spaced-apart relationship; means for supplying current to the anvils; means for holding the anvils in an array; means for performing voltammetric scanning of the sensors; and means connected to the sensors for accepting signals transmitted through them and making analyte concentration measurements thereon, wherein analyte concentration measurements are made at more than one sensor simultaneously using the more than one sensors and more than one means for accepting signals and making analyte concentration measurements thereon.

In some embodiments, the present invention provides an analyte sensor for measuring analyte concentration in a sample comprising: a first anvil and a second anvil that together form the analyte sensor, wherein said anvils are mechanically coupled to one another by a means that enables adjustment of the separation between the anvils such that a liquid sample placed on a surface of one of said anvils can be contacted with a surface the other anvil, thereby establishing conductive contact between the two anvils through the analyte, and retained in such position for a sufficient period of time for an analyte measurement to be made using voltammetric scanning.

In other implementations, the present invention provides methods and materials for preparing components of electrodes useful in the sensors of the invention. In some embodiments, the materials of the present invention are redox-active analyte-sensitive materials (RAMs) useful, e.g., in a working electrode. In other embodiments, the materials are polymers comprising such RAMS covalently attached thereto. In some embodiments, these materials are RAMS suitable for incorporation in printing inks that can be used in print-based fabrication methods.

In some embodiments of the present invention, the materials are composites formed by an ionic liquid, a conductive material, including but not limited to carbon, and a polymer, including but not limited to polyvinylidene fluoride (PVDF), that are useful in forming junctions between an electrode, such as a reference electrode, and the sample in which analyte concentration is to be measured. The methods of the invention include methods for making and purifying the RAMS, polymers, and composites of the invention.

Further, in some implementations the present invention provides electrodes and electrode components and methods for their manufacture and use. These electrodes and electrode components can, in accordance with various embodiments of the invention, be employed in miniaturized sensors for measuring analyte concentrations in microliter-scale samples. In some embodiments, the electrodes and electrode components are useful as replacement parts for sensors in general use to provide better performance and/or to reduce maintenance costs. The methods of the invention include methods for making miniaturized sensors and miniaturized electrodes by depositing sensing materials on suitable substrates by means of various coating, printing, microfabrication, and photolithography methods.

In some embodiments, the present invention provides reference electrodes that employ composites comprising at least one room temperature ionic liquid (RTIL), a carbon allotrope, and a polymeric material that combines the RTIL and the carbon allotrope into a conductive solid matrix. The resultant solid matrix is useful as a component of an RE that contains an internal reference system such as Ag/AgCl immersed in a KCl solution, where the conductive solid matrix separates the KCl solution from the analyte. Alternatively, the conductive solid matrix is useful as a component of an RE that contains no internal solution. In either embodiment, the RE can be used in conjunction with various combinations of WE and counter electrode (CE) in voltammetric analysis.

Functionally the conductive solid matrix acts as a barrier between a constant chemical environment with a characteristic electrode potential and the analyte. The solid matrix is electrically conductive and substantially impermeable to the analyte except protons therein. The conductive solid matrix is referred to as a conductive analyte barrier (CAB). A distinguishing feature of the CAB is its proton permeability through the RTIL component and electrical conductivity through the carbon component. In some embodiments, the CAB is used in conjunction with a conventional Ag/AgCl redox couple in contact with concentrated KCl solution. In other embodiments, the CAB contacts the solid Ag/AgCl redox couple directly. Alternative reference electrode systems such as saturated calomel or copper/copper sulfate systems also produce viable REs in accordance with this invention.

In various embodiments, the CAB comprises an RTIL, a polymer miscible or partially miscible with the RTIL, and a finely divided carbon allotrope such as graphite powder or carbon nanotubes. These ingredients are made into a composite by blending with a melt or solution of the polymer, and then solidified by cooling or by removing the solvent by evaporation. The resulting solid is shaped to fit the opening of a tube, for example, followed by filling the tube with the Ag/AgCl/KCl components. In other embodiments, the melt or solution is used to fill a porous structure such as glass, ceramic, or an inert microporous material such as cellulose. After solidification the porous matrix is shaped and assembled as described above. Other embodiments involve using a porous carbon structure to support a melt or solution of RTIL and support polymer, wherein the porous carbon structure replaces the finely divided carbon allotrope described previously to promote electrical conductivity. In other embodiments, the RTIL and carbon allotrope are incorporated into one or more precursors of a multi-part reactive polymer system such as epoxy or polyurethane. Combining the reactive precursors initiates polymerization. Upon reaction completion, a substantially homogeneous polymer matrix is obtained that is rendered conductive by both the RTIL and carbon components. In other embodiments, an RTIL containing a reactive functional group is used to enable attachment onto a host polymer, or is polymerized or copolymerized to form conductive macromolecular analogs. Depending on the choice of RTIL derivative and its macromolecular equivalent, the techniques described in the previous embodiments is used to form the CAB. For example a macromolecular RTIL or its copolymer with good mechanical strength can be used to form the CAB in the shape required, but in other embodiments, a soft or fragile macromolecular RTIL with good electrochemical qualities is reinforced by a porous matrix. The advantage of using a macromolecular RTIL is to reduce loss of RTIL moieties to the analyte, which is undesirable both because of a possible change in local RTIL concentration in the CAB, affecting its stability, and possible contamination of the analyte especially for small analyte volumes.

In other embodiments, the CAB comprises an RTIL, a miscible or partially miscible polymer, and a carbon allotrope or carbonaceous porous support. An additional component in the CAB is a saturated or supersaturated concentration of AgCl, obtained by adding AgCl to the RTIL prior to blending with other components. This CAB is then brought into contact with Ag/AgCl in the form of a chloridized silver surface. The concentration of AgCl dissolved in the RTIL component and, in turn, the CAB, ensures that the electrode potential at the chloridized silver is kept constant. In all of the foregoing embodiments the RTIL is a single RTIL or a combination of RTILs.

In other embodiments, the CAB comprises an ionic solid based on polycationic congeners of RTILs.

In other embodiments, the CAB comprises a blend of polycations and polyanions.

These and other aspects and embodiments of the invention are described in more detail below and in the accompanying drawings.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Figure 1:
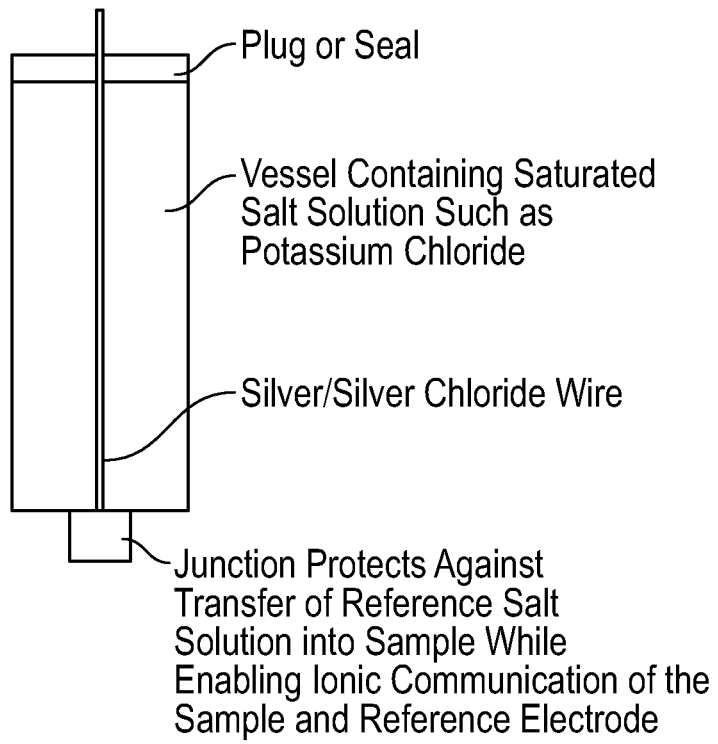
FIG. 1 shows a schematic view of an illustrative voltammetric sensor device in accordance with a representative embodiment of the present invention.

The present invention provides compounds, compositions, methods, electrodes, electrode components, and sensors, including solid state analyte sensors, superior to those currently known in the art. To facilitate appreciation of the benefits of the invention, the following definitions are provided for the convenience of the reader.

Definitions

As used in the specification and the appended claims, the singular forms "a," an" and "the" include plural referents unless the context dictates otherwise. Thus, for example, reference to "a binder" includes a composition of only a single binder and compositions that are mixtures of binders.

"Alkanyl" refers to a saturated branched, straight-chain or cyclic alkyl group. Typical alkanyl groups include, but are not limited to, methanyl; ethanyl; propanyls such as propan-1-yl, propan-2-yl (isopropyl), cyclopropan-1-yl, etc.; butanyls such as butan-1-yl, butan-2-yl (sec-butyl), 2-methyl-propan-1-yl (isobutyl), 2-methyl-propan-2-yl (t-butyl), cyclobutan-1-yl, and the like.

"Alkenyl" refers to an unsaturated branched, straight-chain or cyclic alkyl group having at least one carbon-carbon double bond derived by the removal of one hydrogen atom from a single carbon atom of a parent alkene. The group may be in either the cis or trans conformation about the double bond(s). Typical alkenyl groups include, but are not limited to, ethenyl; propenyls such as prop-1-en-1-yl, prop-1-en-2-yl, prop-2-en-1-yl (allyl), prop-2-en-2-yl, cycloprop-1-en-1-yl; cycloprop-2-en-1-yl; butenyls such as but-1-en-1-yl, but-1-en-2-yl, 2-methyl-prop-1-en-1-yl, but-2-en-1-yl, but-2-en-1-yl, but-2-en-2-yl, buta-1,3-dien-1-yl, buta-1,3-dien-2-yl, cyclobut-1-en-1-yl, cyclobut-1-en-3-yl, cyclobuta-1,3-dien-1-yl, and the like.

"Alkoxy" by itself or as part of another substituent refers to a radical —OR$_{100}$ where R$_{100}$ represents an alkyl group as defined herein. Representative examples include, but are not limited to, methoxy, ethoxy, propoxy, butoxy, and the like.

"Alkyl" refers to a saturated or unsaturated, branched, straight-chain or cyclic monovalent hydrocarbon group derived by the removal of one hydrogen atom from a single carbon atom of a parent alkane, alkene or alkyne. Typical alkyl groups include, but are not limited to, methyl; ethyls such as ethanyl, ethenyl, ethynyl; propyls such as propan-1-yl, propan-2-yl, cyclopropan-1-yl, prop-1-en-1-yl, prop-1-en-2-yl, prop-2-en-1-yl (allyl), cycloprop-1-en-1-yl; cycloprop-2-en-1-yl, prop-1-yn-1-yl, prop-2-yn-1-yl, etc.; butyls such as butan-1-yl, butan-2-yl, 2-methyl-propan-1-yl, 2-methyl-propan-2-yl, cyclobutan-1-yl, but-1-en-1-yl, but-1-en-2-yl, 2-methyl-prop-1-en-1-yl, but-2-en-1-yl, but-2-en-2-yl, buta-1,3-dien-1-yl, buta-1,3-dien-2-yl, cyclobut-1-en-1-yl, cyclobut-1-en-3-yl, cyclobuta-1,3-dien-1-yl, but-1-yn-1-yl, but-1-yn-3-yl, but-3-yn-1-yl, and the like. The term "alkyl" is specifically intended to include groups having any degree or level of saturation, i.e., groups having exclusively single carbon-carbon bonds, groups having one or more double carbon-carbon bonds, groups having one or more triple carbon-carbon bonds and groups having mixtures of single, double and triple carbon-carbon bonds. Where a specific level of saturation is intended, the expressions "alkanyl," "alkenyl," and "alkynyl" are used. The expression "lower alkyl" refers to alkyl groups comprising from 1 to 8 carbon atoms.

"Alkynyl" refers to an unsaturated branched, straight-chain or cyclic alkyl group having at least one carbon-carbon triple bond derived by the removal of one hydrogen atom from a single carbon atom of a parent alkyne. Typical alkynyl groups include, but are not limited to, ethynyl; propynyls such as prop-1-yn-1-yl, prop-2-yn-1-yl, butynyls such as but-1-yn-1-yl, but-1-yn-3-yl, but-3-yn-1-yl, and the like.

"Aryl" refers to a monovalent aromatic hydrocarbon group derived by the removal of one hydrogen atom from a single carbon atom of a parent aromatic ring system. Typical aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene, and the like. The aryl group may be, for example, ($C_5$-$C_{14}$) aryl, including but not limited to ($C_5$-$C_{10}$). Illustrative aryls include cyclopentadienyl, phenyl and naphthyl.

"Arylalkyl" refers to an acyclic alkyl group in which one of the hydrogen atoms bonded to a carbon atom, typically a terminal or sp$^3$ carbon atom, is replaced with an aryl group. Typical arylalkyl groups include, but are not limited to, benzyl, 2-phenylethan-1-yl, 2-phenylethen-1-yl, naphthylmethyl, 2-naphthylethan-1-yl, 2-naphthylethen-1-yl, naphthobenzyl, 2-naphthophenylethan-1-yl and the like. Where specific alkyl moieties are intended, the nomenclature arylalkanyl, arylakenyl and/or arylalkynyl is used. In preferred embodiments, the arylalkyl group is ($C_6$-$C_{20}$) arylalkyl, e.g., the alkanyl, alkenyl or alkynyl moiety of the arylalkyl group is ($C_1$-$C_6$) and the aryl moiety is ($C_5$-$C_{14}$). Illustrative embodiments include the arylalkyl group ($C_6$-$C_{13}$), e.g., the alkanyl, alkenyl or alkynyl moiety of the arylalkyl group is ($C_1$-$C_3$) and the aryl moiety is ($C_5$-$C_{10}$).

An "analyte" is a chemical species of interest present in a sample, the presence of which is detectable or the concentration of which is measurable using an analyte sensor system that incorporates a working electrode.

An "analyte-sensitive material" or "ASM" is a redox-active material that is sensitive or substantially sensitive to the presence or concentration of an analyte in a sample within those user-defined application-specific tolerances. "Substantially sensitive" to an analyte is used to mean sensitive within the tolerances required for a given application, as those tolerances are defined by an end user.

An "analyte-insensitive material" or "AIM" is a redox-active material that is insensitive or substantially insensitive to the presence or the concentration of an analyte in a sample. "Substantially insensitive" to an analyte is used to mean insensitive within the tolerances required for a given application, as those tolerances are defined by an end user.

An "analyte insensitive electrode" (AIE) is a special case of a reference electrode where the current flow depends in part on redox processes that are independent of the presence or concentration of species (apart from a minimum threshold of supporting electrolyte) in the sample composition including but not limited to the analyte. The AIE serves to provide a response that does not vary across time or sample composition and therefore can be used as an internal standard or 'zero point' to which the WE response may be compared. See PCT Pub. No. 2010/104962, incorporated herein by reference. An AIE contains one or more RAMs in electrical contact with a conductive substrate, a pseudo reference electrode (PRE, as defined below), and a means to place the RAM and often the PRE in a constant chemical environment isolated from, but in electrical and fluid communication with, an analyte solution. The conductive substrate and RAM of an AIE may be referred to herein as an "internal working electrode" or "IWE". As used herein, AIE can, depending on context, refer to the integrated functional unit (IWE, constant chemical environment, and PRE) or to the IWE or only to the matrix material component of the IWE. In the context of the current invention, a constant chemical environment is a buffer material that resists change in hydronium ion or hydroxide ion, i.e. pH, such that the RAM outputs a stable, reproducible voltammetric signal. Buffer solutions are the simplest form of constant chemical environment. ASMs of the current invention respond precisely to the formulation of buffer solutions. This characteristic leads to the deliberate use of a buffer solution to produce a signal even more stable than conventional reference electrodes such as Ag/AgCl/KCl. The design and implementation of materials to create constant chemical environments are detailed below. Significantly, a constant chemical environment used in conjunction with an AIM such as ferrocene overcomes two shortcoming of that compound, namely: 1) its propensity to respond slightly to changes in analyte pH despite expectations to the contrary; and 2) the limited pH range (ca. 4 or above) for which ferrocene responds with a usable voltammetric signal.

An "analyte sensing device" is a sensor, a means to measure the signal from the sensor, and optionally a means to display that signal. A pH meter is a type of analyte sensing device. Thus, in some embodiments, an analyte sensing device includes a controller/processor unit, associated programs and algorithms, and a probe.

A "counter-electrode" or "CE," also sometimes referred to as an "auxiliary electrode," is an electrode that is required, in some analyte sensors, to pass current through the electrochemical cell to complete the electrical circuit. The CE serves as a source or sink of electrons and allows current to flow through the WE to effect the redox reaction. To avoid unwanted electrochemical redox processes occurring at the CE, which may interfere with the signal measured at the WE, CEs are typically made using relatively chemically inert materials, commonly platinum (Pt), but carbon allotropes are also commonly employed. Certain other metals may also be used, especially those exhibiting stability in harsh environments. Examples include, but are not limited to, gold, stainless steel, titanium, and specialty alloys.

"Coaxial" refers to a common axis about which various components, for example, electrodes, are positioned. In some embodiments, "coaxial" refers to a radial symmetry of concentrically or approximately concentrically positioned components. In some embodiments, the term "coaxial" refers to one or more electrodes being concentrically positioned within an outer or externally positioned electrode component; for example and without limitation, a WE, CE, and RE are coaxially positioned when the CE is the outer ring of a sensor tip that is immersed in the analyte solution, the WE is in the middle of the tip, and the RE is interposed between CE and the WE. See PCT Pub. No. 2010/111531, incorporated herein by reference.

"Dispersed" or "associated" in reference to a material, means that it is dissolved in a solution or suspended as a colloid, in a gas, liquid or solid. The term also encompasses embodiments in which the material is covalently bound to the surface of a solid or to a component of the solid. The term also encompasses embodiments in which the material is incorporated as a dopant in a crystal lattice. The term also encompasses materials intercalated within a solid.

An "electrode" is a component of a probe.

A "pseudo-reference electrode" or "PRE" is a type of electrode in the category of electrodes whose potentials vary predictably in accordance with the conditions of their environments. Once established, such correlation may be used to calculate an electrode potential for known conditions even if those conditions go beyond the relatively narrow range in which conventional reference electrodes are applicable, for example non-aqueous solutions or temperatures far from ambient. In those situations they provide a reasonably constant potential over the timescale of an electrochemical experiment, and the absolute potential of the PRE can be back-calibrated to a RE if required. Pseudo-reference electrodes typically do not comprise both halves of a redox couple. One example of a PRE is a silver wire (used commonly in non-aqueous electrochemistry). More recently, PREs have been used as a component of an AIE.

A "redox-active material" is a compound or composition that may be oxidized and reduced. "Redox activity" refers to either or both of those processes.

A "reference electrode" (RE) is an electrode used to establish the potential difference applied to the WE. Conventional REs have a certain fixed chemical composition and therefore a fixed electrochemical potential, thus allowing measurement of the potential difference applied to the WE in a known, controlled manner. An RE typically comprises two halves of a redox couple in contact with an electrolyte of fixed chemical composition and ionic strength. Because both halves of the redox couple are present and the composition of all the species involved is fixed, the system is maintained at equilibrium, and the potential drop (i.e., the measured voltage) across the electrode-electrolyte interface of the RE is then thermodynamically fixed and constant. For example a commonly used RE system is the Ag|AgCl|KCl system with a defined and constant concentration of KCl. The two half-cell reactions are therefore: $Ag^+ + e^- \rightarrow Ag$; and $AgCl + e^- \rightarrow Ag + Cl^-$. The overall cell reaction is therefore: $AgCl \rightarrow Ag^+ + Cl^-$ for which the Nernst equilibrium potential is given as: $E = E_0 - (RT/F)*\ln[Cl^-]$, where E is the measured RE potential, $E_0$ is the standard potential of the Ag|AgCl couple vs. the standard hydrogen electrode with all species at unit activity (by convention the standard hydrogen electrode is defined as having a potential of 0.0V); and R, T, and F are the universal gas constant, temperature, and Faraday constant, respectively, in appropriate units. Hence, the potential of this system depends only on the concentration (more strictly speaking the activity) of $Cl^-$ ion present, which, if this is fixed, provides a stable, fixed potential. Many other RE systems are known in the art. It is imperative that the composition of the RE remains constant, and hence almost no current should be passed through the RE (otherwise electrolysis will occur and the composition of the RE will change), which necessitates the use of a third electrode, the counter electrode (CE), to complete the circuit. However, two-electrode configurations can be used in the special case where the WE is a microelectrode, having at least one dimension typically smaller than 100 micrometers. In this case, the currents passed at the WE are small, and therefore a two-electrode cell can be used with a RE, but without the need for a CE.

A "probe" refers to a sensor that contains multiple electrodes. A probe can include, for example, a working electrode, a counter-electrode and a reference electrode (either a conventional reference electrode or a pseudo reference electrode). A probe can include, for example, a working electrode, a counter electrode and an analyte-insensitive electrode (an IWE and PRE).

A "sensor" is an electrode or collection of electrodes that generate a signal in response to the presence of an analyte.

A "surface" of an electrode refers to the functional surface, i.e., that portion of the surface that is in contact with the analyte sample and serves an electrical or electrochemical purpose. It would not, for example, include an insulating WE housing through which no current or voltage passes. The surface of a WE is the portion of the electrode surface in contact with the sample that detects current or electrical potential relative to the RE. The surface of a CE refers to the portion in contact with the sample that serves to deliver or accept current to or from the WE.

A "working electrode" or "WE" is the electrode at which the electrochemical process for detecting the analyte of interest occurs. In a sensor, the working electrode may be sensitive to one or more analyte(s) in the test sample, or it may be chemically modified with analyte sensitive species/materials. The electrochemical response of the working electrode is measured after some perturbation to the system under study has been applied. For example, the perturbation may be the application of a potential difference to the WE that induces electron transfer to occur, and the resulting current at the WE is then recorded as a function of the applied potential (voltammetric mode). This example of mode of operation is illustrative and not exhaustive, as many other modes are known in the art. The WEs of the invention contain an ASM that can undergo a reversible electrochemical redox reaction dependent upon the concentration of analyte (hydrogen ions for a pH meter; other analytes for other analyte sensing devices) in a sample solution and an applied electrical potential. For example, where there is a high concentration of hydrogen ions present in a sample solution, the redox reaction occurs at a lower potential. Conversely, where there is a low concentration of hydrogen ions present in a sample solution, the redox reaction occurs at a higher potential. The relationship between these characteristic potentials and the sample solution pH is a function of the chemical identity of the ASM. An algorithm converts electrical potential to pH value to provide a means of determining the pH of an unknown sample.

With the above definitions in mind, the reader can better appreciate the various aspects and embodiments of the invention described below.

Miniaturized Analyte Sensors

In a first aspect, the present invention provides miniaturized analyte sensors that enable measurement of analyte concentration in small sample volumes of about ten or fewer microliters, using voltammetric sensor technology. In one embodiment, the invention provides sensor technology for measurement of electrolyte in solutions, including, most notably, but not limited to, hydronium ion concentration or pH. Other voltammetric sensor technologies provided by this invention include sensors designed for specific analytes presently detected with sensors in various form factors and sample containment arrangements.

The present invention also provides analyte concentration measurement devices in which the reference, sensor, and counter electrodes are spatially oriented in means advantageous to measuring analyte concentration in small sample volumes. In these devices, various sensor components are placed in a pair of "anvils" on which the sample is placed (or otherwise contacted) in performing the measurement. The sample is held in place by surface tension between the two anvils, each comprising a surface having a containment area where the sample is deposited (or otherwise contacted) for measurement. One or typically both anvils have embedded in them one or more electrodes of the analyte sensor in conductive contact with a surface of the anvil having a containment area wetted by the sample. In some embodiments, the containment area is defined by a hydrophilic coating that facilitates spreading of the sample on the surface of the sensing elements. In some embodiments one or more electrodes of the sensor are fabricated by printing the electrode components on suitable conductive substrates including, but not limited to, carbon allotropes, noble metals, and conductive polymers.

In some embodiments, these devices enable multi-channel analyte concentration measurements on a plurality of microliter-scale liquid samples, each held by surface tension between two anvils that together form a sensor, wherein a single voltammetric analysis is performed across an array of such sensors. In some embodiments, the device for making analyte concentration measurements on a plurality of liquid samples contained by surface tension comprises: means for containing a plurality of liquid samples by surface tension between opposing, proximal-ends of a plurality of sets of anvils, wherein each set of anvils provides a functional sensor, said anvils optionally in a substantially parallel, spaced-apart relationship; means for supplying current to the anvils; means for holding the anvil pairs in an array; means for performing voltammetric analysis with the sensors; and means connected to the sensors for accepting signals transmitted through them and making analyte concentration measurements thereon, wherein analyte concentration measurements are made at more than one sensors simultaneously using the more than one electrode and more than one means for accepting signals and making analyte concentration measurements thereon.

In some embodiments, the invention provides an analyte sensor for measuring analyte concentration in a sample comprising: a first anvil and a second anvil that together form the analyte sensor, wherein said anvils are mechanically coupled to one another by a means that enables adjustment of the separation between the anvils such that a liquid sample placed on a surface of one of said anvils can be contacted with a surface the other anvil, thereby placing the two anvils in conductive contact, and retained in such position for a sufficient period of time for an analyte measurement to be made using voltammetric scanning.

The devices of the invention can take the form and optionally include the functions of devices currently marketed for making optical absorbance measurements on microliter-scale samples generally described in U.S. Pat. Nos. 7,397,036; 7,872,749; and 8,189,199 (see also U.S. Pat. Nos. 7,623,225 and 8,223,338), each of which is incorporated herein by reference. Those of skill in the art will recognize the significant benefit of combining the pH measurement technology of the present invention with the optical absorbance measurement technology described in these patents.

Voltammetric Sensor Technology

The mechanism of action in a voltammetric sensor device is uniquely different from that of glass pH probes, which generate a potentiometric signal. In a voltammetric sensor, a redox reaction that occurs upon exposure of a sample to the working electrode gives rise to peak voltage in square wave voltammetry analysis that is highly dependent on sample pH (or other analyte concentration). A linear relationship of pH to peak voltage exists that is highly reproducible. Voltammetric sensor devices for measurement of pH (and other analyte concentrations) are described in PCT Pub. Nos. WO 2010/111531; WO 2010/118156; and 2012/018632, each of which is incorporated herein by reference.

The microsensors of the invention are particularly effective at measuring analyte concentration in low sample volumes, because for voltammetric sensor devices, decreasing sample volume increases the ratio of sensor surface area in contact with the sample to sample volume. Increasing this ratio results in a larger portion of the available analyte in contact with the sensor surface. When a greater portion of the sample interacts with the sensor surface, more signal is generated; this benefits detection and analysis of dilute analyte samples.

Voltammetric sensor devices of the invention can be entirely solid state and have reversible chemistry surfaces. They are more resistant to fouling and do not require re-calibration. Hence the device can be assembled with factory calibrated sensors in a ready state for sample measurement.

A voltammetric sensor device has three main components, the sensor or working electrode, the reference electrode, and the counter electrode. In the voltammetric microsensor devices of the invention, these three components can be spatially oriented in a manner that facilitates accurate analyte concentration measurement very small volume samples. The electrodes of a voltammetric sensor are generally described below, together with the improvements to them provided by the present invention.

The Reference Electrode

In a voltammetric sensor of the invention, the reference electrode may be solid state, liquid filled, or gel filled. The reference electrode is used for normalization of measurements of electrolyte (analyte) in solution. A typical reference electrode is a silver/silver chloride reference electrode. In an illustrative voltammetric sensor device of the invention, the silver/silver chloride reference electrode can be constructed, as shown in FIG. 1.

The methods and materials of the present invention include embodiments that can be used to avoid many common problems observed with conventional reference electrodes. More specifically, the invention solves problems that result in drifting, clogging, and salt leakage, problems currently encountered with all types of reference electrodes today, by providing a new type of reference electrode junction.

To produce accurate and precise pH readings, the reference electrode needs to maintain a stable potential that does not vary or drift over time. The cause of drift observed in conventional pH meters and other analyte sensors is mostly due to the reference junction. There are a variety of existing junctions, including open, sleeved, and porous plugs. Each of these junctions requires routine maintenance to keep the reference electrodes from fouling, clogging, or drifting. Over time, as the junction becomes clogged or fouled, it directly affects the potential stability and response time of the reference electrode. Another issue with existing reference electrode junction technology is cross contamination of the internal solution of the reference electrode with the external analyte or other components in the sample. This can be detrimental in many applications that require absolute control of the measured sample. To remedy these issues, the present invention provides a solid composite material that provides all the performance of a traditional junction, but does not foul, clog, or leak.

In some embodiments, the present invention provides a sensor comprising a voltammetric WE in combination with a RE fabricated substantially as described in U.S. Pat. No. 7,628,901, incorporated herein by reference.

In other embodiments, the invention provides a sensor comprising a voltammetric WE in combination with a RE having a reference junction that is a composite material comprising of an ionic liquid (IL), including but not limited to an RTIL, a conductive material, and a polymer. Specifically, in some embodiments, the present invention provides a reference electrode with an analyte contact surface that exhibits a highly stable potential; is wet-dry reversible, that is, does not significantly change its physical or electrochemical characteristics even if the electrode is allowed to dry under typical room conditions; is resistant to a wide range of chemicals; and requires no tedious maintenance procedures typical of conventional liquid-junction reference electrodes. In various embodiments, the present invention provides reference electrodes suitable for voltammetric pH measurements comprising an RTIL in a matrix material that exhibits structural integrity, electrical conductivity, and selective passage of protons.

While any suitable ionic liquid can be used in the REs employed in the sensors of the invention, suitable ILs include room temperature ionic liquids (RTILs) are organic salts that exist in liquid state at ambient temperatures. Typically they consist of bulky, asymmetric organic cations such as 1-alkyl-3-methylimidazolium, 1-alkylpyridinium, N-methyl-N-alkylpyrrolidinium and ammonium ions. Typical anions include tetrafluoroborate and hexafluorophosphate. A large variety of compositions have been produced with common attributes of being powerful solvents and electrolytes. Both attributes are important in producing stable CABs in the RE. In some embodiments, the IL is 1-Methyl-3-octylimidazolium bis(trifluoromethylsulfonyl)imide. In an alternate embodiment, the IL is 1-Methyl-1-propylpiperidinium bis(trifluoromethylsulfonyl)imide. Both ILs are available commercially from Iolitec (Cat. No. IL-0099 and IL-0045, respectively).

Various conductive materials can be used as a component of the CAB, including but not limited to carbon, copper, and gold. In some embodiments, the conductive material is a graphite powder of 45 micron particle size (commercially available from Sigma Aldrich, Cat. No. 496596). Various hydrophobic polymers can be used a component of the CAB. In some embodiments, the polymer is polyvinylidene flouride (PVDF, commercially available from Sigma Aldrich, Cat. No. 427152).

Thus, the present invention provides solid composite materials comprising such mixtures of IL, conductive material, and polymer. In some embodiments, the composite material is a mixture of PVDF, carbon, and an IL. Some embodiments of the composite material was made as follows.

Preparation of Reference Electrode Junction Composite Material and Junction 2 g of polyvinylidene fluoride (PVDF) powder (Kynar 721, Arkema) and 250 mg of graphite powder were thoroughly mixed together. 1.5 g of 1-Methyl-3-octylimidazolium bis(trifluoromethylsulfonyl)imide was then added to the PVDF/graphite mixture and mixed thoroughly. After 15 min the mixture was heated to 200° C. for 1 hour to form a melt. The melt was allowed to cool for 15 minutes and then removed from the vial. A plug was punched out of the composite disc and used as a reference junction.

Construction of a Reference Electrode with Reference Junction

Two methods are provided for construction a reference electrode comprising a reference junction of the invention. Each reference electrode was tested to determine the reference potential using pH 2, 4, 7, 10, and 12 standard buffer solutions and the results compared to those obtained using a Cole Parmer standard calomel electrode (SCE) with an Agilent multimeter.

Construct 1

Figure 2:
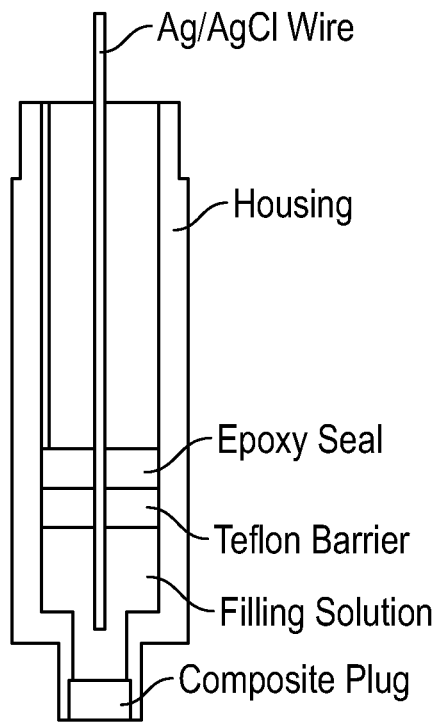
FIG. 2 shows a schematic view of a reference electrode construct in accordance with a representative embodiment of the present invention.

The composite plug was installed into one end of a polysulfone tube having an internal diameter (ID) of 0.122". The other end of the polysulfone tube opens up to an ID of 0.250" and was filled with a reference solution composed of 3M KCl solution saturated with $AgNO_3$ and thickened with 2% hydroxyethyl cellulose. A chloridized silver wire was embedded into the reference solution and suspended in place with a polytetrafluoroethylene (PTFE) plug. The PTFE plug was sealed with an epoxy adhesive. A schematic of a non-limiting, representative construct is shown in FIG. 2.

Figure 3:
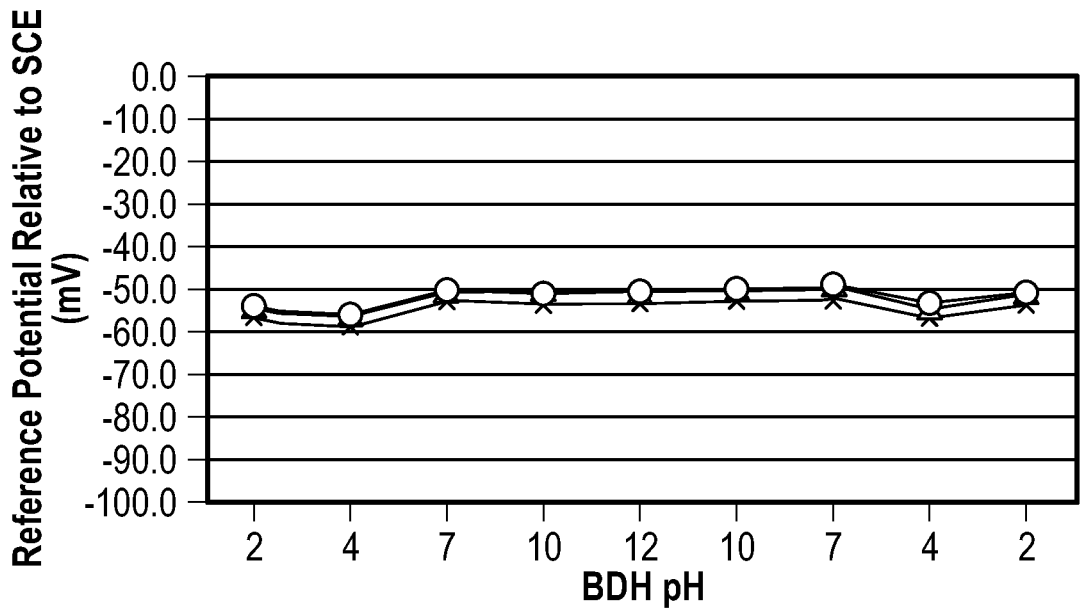
FIG. 3 shows a graph demonstrating the stability of three reference electrodes in accordance with representative embodiments of the present invention.

Three reference electrodes were made as described and tested versus a Cole Parmer SCE. Each reference electrode was tested using a "pH staircase" at pH 2, 4, 7, 10, 12. The potential was measured with an Agilent multimeter. The graph provided in FIG. 3 demonstrates the stability of three reference electrodes across a broad pH range and demonstrates that the composite plug allows ionic communication between the Ag/AgCl redox system and the external analyte. A small deviation was observed when the RE was tested in phthalate buffer (pH 4).

Figure 4:
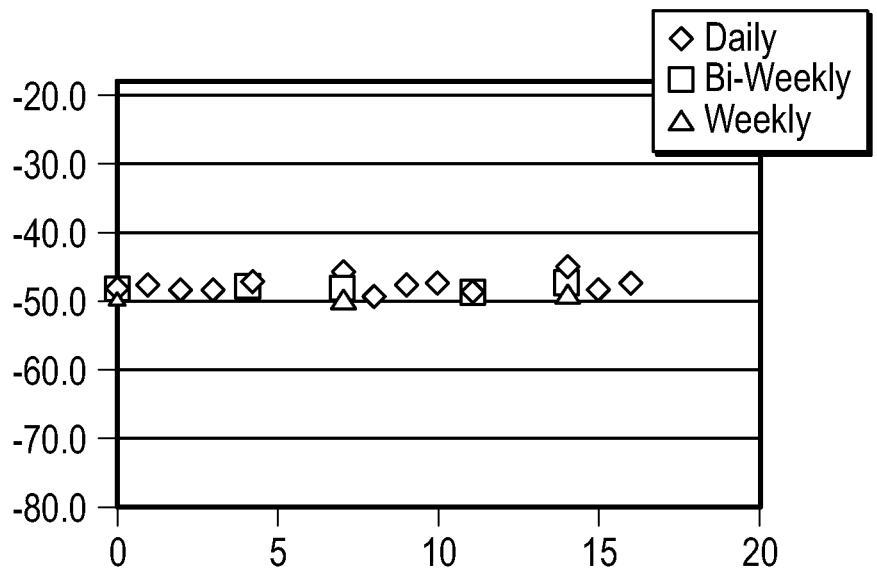
FIG. 4 shows a graph demonstrating the average potential of each electrode after it has undergone pH 2-12 staircase testing in accordance with a representative embodiment of the present invention.

Additional testing was done to demonstrate the stability of the electrode after about two days of dry storage. Three new electrodes were constructed as described above, and each was tested in pH 7 buffer on a daily, bi-weekly, and weekly basis. The graph shown in FIG. 4 demonstrates the average potential of each electrode after it has undergone pH 2-12 staircase testing as described above. After 16 days of testing, the electrodes remained virtually free of potential drift after being stored dry, and showed no delay in response time. No salt crystals were observed on the surface of the dried reference junction, unlike with traditional reference electrodes, indicating that the components of the internal reference electrode crossed the reference junction.

Construct 2

Figure 5:
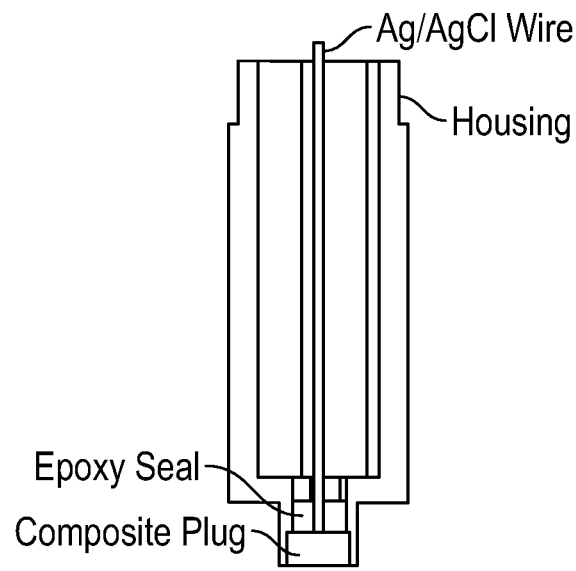
FIG. 5 shows a schematic view of a reference electrode construct in accordance with a representative embodiment of the present invention.

A second reference electrode of the invention was constructed to illustrate how the invention eliminates the need of an internal filling solution, thereby providing a completely solid state reference electrode. This was accomplished by embedding a Ag/AgCl wire directly into the composite plug reference junction prepared as described above. A Ag/AgCl disc was also demonstrated to work well. In both versions, the back end can be sealed with a suitable material, such as an epoxy. FIG. 5 illustrates the construct containing the wire embedded directly into the reference junction.

Figure 6:
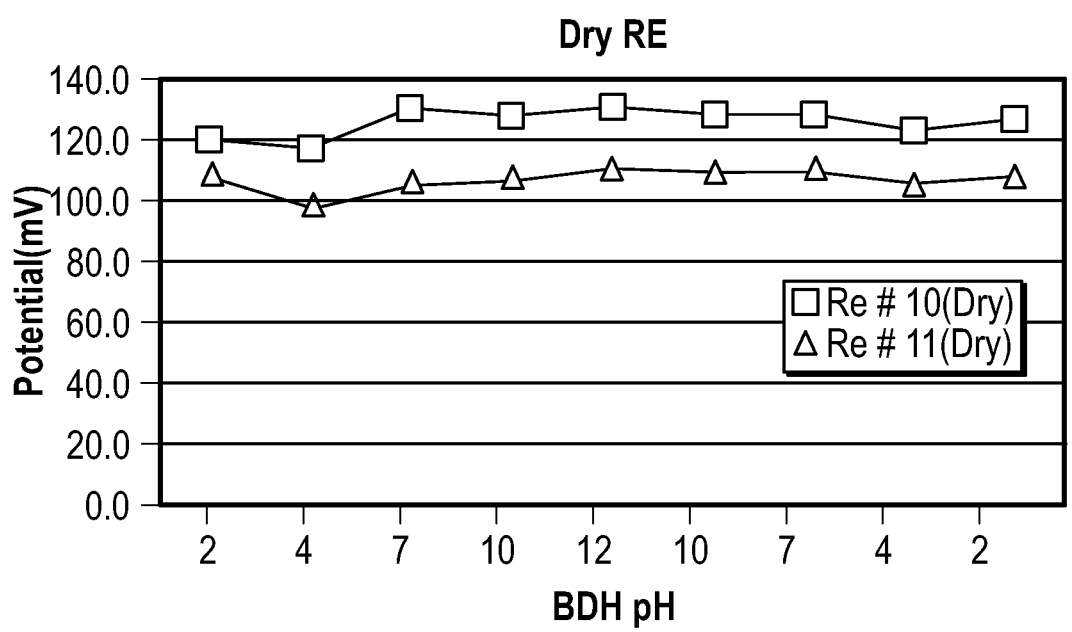
FIG. 6 shows a graph demonstrating stable potential by directly embedding the Ag/AgCl wire directly into the composite plug reference junction in accordance with a representative embodiment of the present invention.

Two of these reference electrodes were made and subjected to staircase testing as described above. The results shown in FIG. 6 demonstrate that, without replenishing the internal filling solution, a stable potential can still be achieved by directly embedding the wire into the reference junction. Again, note a similar deviation in potential at pH 4. Also, the potential relative to an SCE also shifted from −49 mV to +100 mV.

Those of skill in the art will recognize from the disclosure above that various optimization steps and materials can be incorporated, including steps that enhance the hardness of the plug and homogeneity of the mixture used to form the composite material. See Cicmil et al., Electroanalysis 23(8): 1881-1890; Shibata et al., Analyt. Sci. 26(11): 1203-1206; and U.S. Pat. Nos. 7,628,901; 8,187,453; and 8,227,293, each of which is incorporated herein by reference.

Those of skill in the art will also appreciate that these reference electrodes can be made in any size, including a size small enough to permit locating them in one of the anvils that forms a sensor in the miniaturized sensors of the invention. Moreover, one can make the reference electrodes using microfabrication techniques standard in the art.

The Working Electrode

The working electrode of the voltammetric sensors of the invention can be constructed of a suitable electrically conductive substrate, such as carbon or certain metals, or certain semiconductors. This substrate is coated with an analyte-sensing material attached to the substrate covalently, by polymeric entrapment, by adhesion or adsorption, or by other means. In some embodiments, the redox active analyte sensing material is covalently attached to the substrate surface. In other embodiments, the analyte sensing material is not attached directly to the substrate surface but is instead either covalently attached to or physically entrapped within a polymeric or composite material that is in turn attached to the substrate surface (covalently or by adhesion or adsorption).

In other embodiments, there is no substrate; instead, the electrode is simply prepared from a polymeric material that contains such sensing chemistry (i.e., a RAM) attached to the polymer matrix covalently, by polymeric entrapment, by adhesion or adsorption, or by other means to form a conductive material.

In any of these embodiments, the polymeric material can be any material described in PCT Publication WO 2012/018632. The present invention also provides new polymeric materials suitable for use in the working electrodes of the invention. In some embodiments provided by the invention, the polymeric material is a hybrid silica-polyvinyl alcohol (PVA), which can be prepared as described in Pirzada et al., 2012, Langmuir 28: 5834-5844, incorporated herein by reference, and the RAM is covalently attached to either the PVA, the silica, or both, or the RAM is physically entrapped within nanofibers composed of such material. In another of these embodiments, a polymeric cyclodextrin with RAM molecules entrapped in the individual cyclodextrin molecules is used, either alone or in admixture with another polymer or material.

Figure 7:
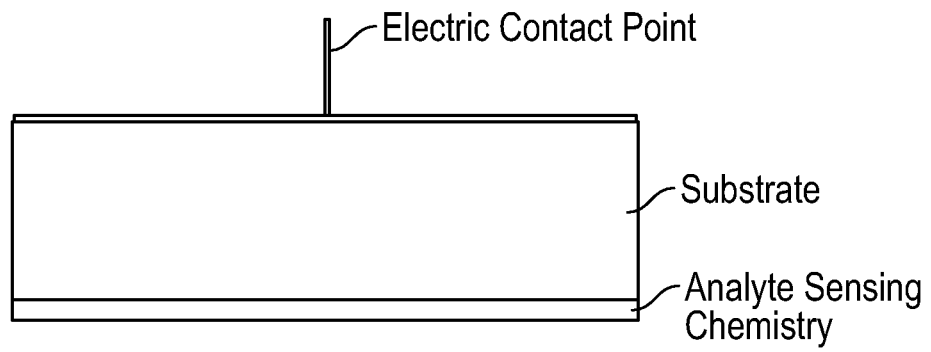
FIG. 7 shows a schematic view of a working electrode construct in accordance with a representative embodiment of the present invention.

More generally, the working electrode substrate (if present, and if not present, then the material comprising the analyte sensing chemistry) has electrical contact point(s) for applying electrical current. A working electrode in accordance with the present invention is shown in FIG. 7.

The Counter Electrode

The counter electrode supplies current to complete the circuit between the sample and device and must be conductive.

Electrode Configurations in Miniaturized Analyte Sensors

With the above background regarding the electrodes of voltammetric sensors and the improvements to them provided by the present invention, those skilled in the art can better appreciate how the many different embodiments of the miniaturized analyte sensors of the invention can be constructed. In brief, the spatial arrangement of the working, reference, and counter electrodes can be designed in any fashion that provides simultaneous contact of these components with the sample, and immersion into the sample is not required. In particular, a microliter-level analyte sample appropriately held by capillarity and spread into a thin film is sufficient to span the active surfaces of the sensing elements. This feature, in turn, provides myriad new opportunities to measure analyte concentration, particularly pH, in environments and test conditions and with samples not accessible with current glass electrodes.

Thus, the voltammetric sensor technology of the present invention is useful in many applications where glass electrodes provide only limited utility or simply cannot be used. For example, the present invention provides methods for high throughput pH (or other analyte concentration) measurement of samples, including biological samples such as serum, urine, plasma, cell lysates, and like liquids. In some embodiments of these methods, robotics are employed using disposable or re-useable multi-well format sensor devices provided by the invention and described below.

In addition, practice of the present invention allows in-line monitoring of pH (or other analyte concentration) using extremely small sensors. The ability to detect changes at microliter-scale aliquots directly improves the resolution of the measurement. This is of enormous benefit for use in, for example and without limitation, HPLC, LCMS, and other chromatography systems. In-line pH monitoring is of limited utility with glass electrodes due to size restrictions, re-calibration requirements, and drift related error. Moreover, glass electrodes require a much larger sample volume to envelop the sensing membrane and reference junction contemporaneously with the same analyte composition. Resolution is inherently poor due to uncertain mixing patterns in the vicinity of the electrode even if the remainder of the flow path has been designed to enable high resolution separation. The voltammetric sensors of the invention, particularly those that are entirely solid state, are not limited by these restrictions.

The miniaturized sensors of the invention are also of significant benefit in diagnostic applications. The invention provides devices that can be used to measure pH (or other analyte concentration) at the point of care with high mobility and reliability. The invention also provides disposable, one-time use sensors that can provide accurate results reliably and with minimal maintenance.

For example, monitoring of pH in cell culture or electrolytes in commercially available sterile culture bags or other containers is enabled by installing single-use voltammetric sensor devices of the invention into such containers. Unlike glass probes, the devices of the invention are not susceptible to breakage, nor do they require periodic re-calibration necessitated by drift due to fouling or contamination of the reference electrode. Another advantage is that these devices can be flat and/or flexible and so easily secured to an inside wall of the bag or other container. Electrical connections can be made across the wall of the bag or other container maintaining wall integrity, so the devices can be connected to the required electronics. In some embodiments, the present invention provides a multi-position microliter-scale voltammetric sensor device capable of delivering accurate results with sample volumes less than 10 microliters, for pH, electrolytes, or other sample constituents. In various embodiments, samples applied to the device are spatially contained in the absence of a vessel by means of capillary affect, hydrophobic containment, or micro-wells.

The sensor devices of the present invention exploit the fact that only surface contact of the sensor components to the analyte sample is required to obtain a measurement. The analyte sample volume is governed primarily by the space between two planar surfaces incorporating the sensing elements. To accomplish this, devices are provided where the gap between the planar surfaces is precisely and reproducibly regulated by mechanical or electromechanical means, using a variety of mechanisms, including but not limited to rack-and-pinion, screw-driven positioners, and servo motors and associated circuitry, optionally with optical or mechanical monitoring and feedback control. Capillary forces hold the liquid sample in place without requiring a sample container. In general the smaller the gap the easier the liquid is retained between two wetted surfaces; this particularly favors retention and measurement of microliter-scale analyte samples.

In some embodiments, samples are spatially constrained with two opposing parts, in the form of anvils, of a voltammetric sensor device. In this embodiment, the amount of the sample subject to capillary capture is dependent on the sample surface tension relative to the opposing planar surfaces. In all cases, the analyte is presumed to wet all of the sensing elements: working electrode, reference electrode, and counter electrode. The area wetted by the analyte is optionally confined by surrounding the sensing elements with a surface not wetted by the analyte. In various embodiments, the analyte sample is confined by the area, shape, and the arrangement of hydrophobic and hydrophilic portions of opposing anvil surfaces.

The present invention provides, in some embodiments, for use of a hydrophobic material such as polyvinylidene fluoride (PVDF), polytetrafluoroethylene (PTFE), other fluorinated polymers, polysulfone, polyethersulfone, polyphenylenesulfide, and other polymers or copolymers that exhibit good chemical resistance and are inherently hydrophobic, to increase surface tension with aqueous analyte samples. Alternatively, a hydrophobic coating may be applied to the surface of an electrode to define the area wetted by the aqueous analyte sample.

Figure 8:
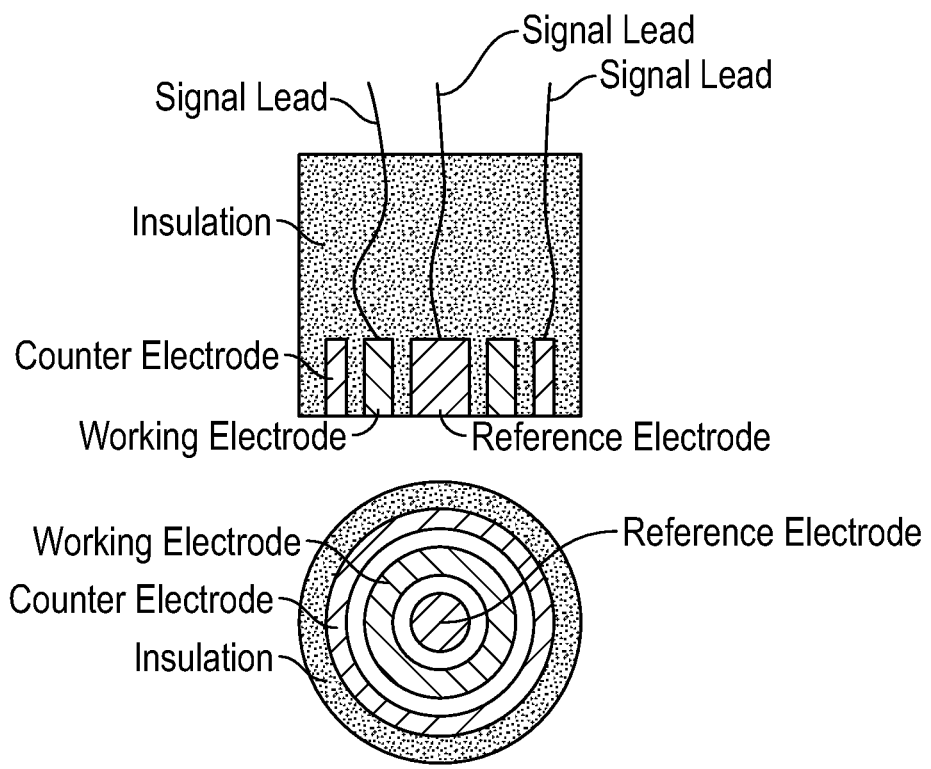
FIG. 8 shows schematic views of a pH-sensing electrode in accordance with a representative embodiment of the present invention.

In an embodiment, the hydrophobic polymer material is also used as support for one or more sensing elements in the construction of the anvil-like structures that form the capillary space for analyte retention. FIG. 8 illustrates schematically a pH-sensing electrode of the present invention. In this example, the sensing elements comprise cylindrical or annular-shaped electrodes embedded in an insulation made from a hydrophobic polymer material from the preceding list. Each electrode is wired with signal leads for capturing the signal generated. The overall cylindrical shape of this sensor assembly is preferred for capturing and spreading a liquid droplet across all of the sensing elements uniformly.

Figure 9:
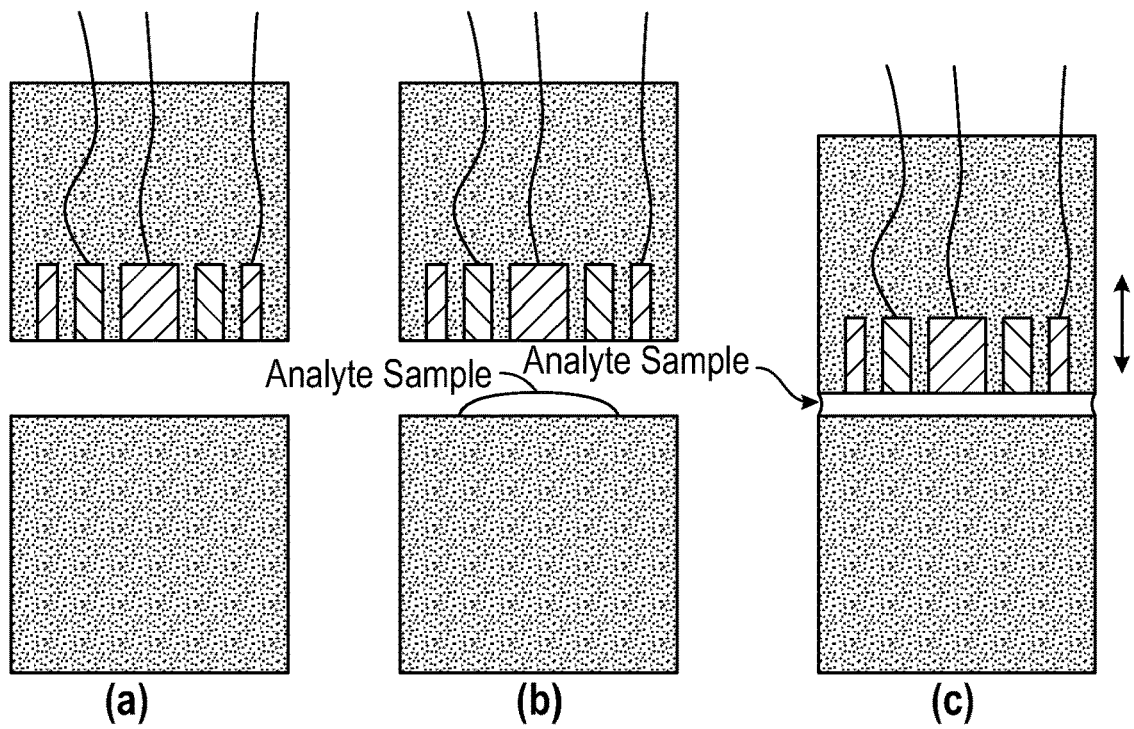
FIG. 9 shows schematic views of a pH sensor assembly in accordance with a representative embodiment of the present invention.

In operation, a sensor assembly is located opposite a cylinder of similar dimensions to form two opposing, parallel planar surfaces, as shown FIG. 9. In part (a) of FIG. 9, the sensor assembly is located in an open position. A droplet of analyte sample is placed on the lower cylinder as shown in part (b). Then the sensor assembly is lowered to a precisely regulated distance from the lower cylinder such that the analyte sample contacts both planar surfaces and fills the gap thus formed, as shown in (c). The size of the gap determines the liquid volume needed to fill the space and to ensure wetting of the sensing elements. Using a cylindrical sensor assembly of about 1 cm in diameter, no more than 10 microliters of analyte is sufficient to generate a pH measurement reliably. More typically a sample size of 5 microliters can be used. The lower limit of the analyte volume is determined not only by the mechanical precision of controlling the capillary space, but also by the nature of the analyte sample and the characteristics of the sensing elements, especially of the working electrode. For example, the amount of hydronium ions in the analyte should be above a certain level such that in the course of voltammetric measurement the concentration of that ion should not be significantly affected due to redox reaction with the analyte sensing molecule. Such changes are minimal in typical pH measurements where the ratio between analyte volume and working electrode surface is so large that redox reactions at the electrode surfaces have virtually no effect on the composition of the analyte. By contrast, in measuring microliter-scale samples either or both of the hydronium ion concentration and the density of ASM moieties on the working electrode could determine the measured pH value as compared to the true value of the bulk analyte. The practical lower limit of analyte volume is optimized based on these considerations.

Figure 10:
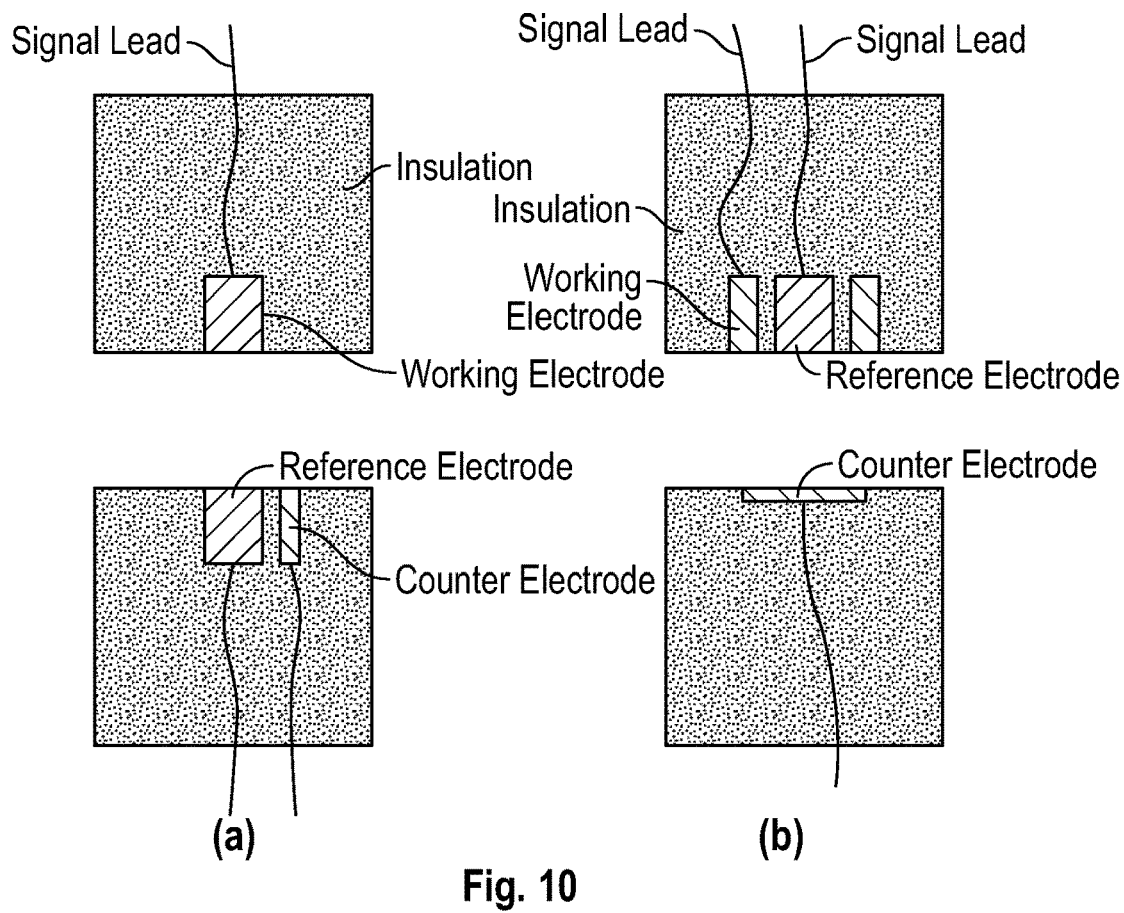
FIG. 10 shows schematic views of counter and reference electrodes positioned opposite a working electrode in accordance with representative embodiments of the present invention.

Various alternative embodiments of electrode placement have similar functionality. The schematic configurations provided in FIG. 10 show (a) the counter and reference electrodes located opposite the working electrode; and (b) the counter electrode located opposite the working and reference electrodes. In both cases, the analyte sample is placed on the lower planar surface, and then the upper planar surface is lowered to form the capillary space, thereby establishing a predetermined analyte volume, wetting of all sensing elements, and thus electrical communication enabling pH measurement.

A series of experiments was conducted to illustrate the features of this invention using configuration (a) depicted in FIG. 10. Two electrode assemblies were constructed, wherein the upper assembly comprised a working electrode, and the lower assembly comprised the reference and counter electrodes. Analyte samples of 10 microliters were dispensed on the lower electrode assembly, and the upper assembly was lowered using a modified microscope stage until it contacted the analyte sample. A video camera was used to verify liquid contact on both planar surfaces. Calibration data was generated using BDH Brand standards for pH 2, pH 4, pH 7, and pH 10. Square wave voltammetry plots for each buffer are overlaid in FIG. 11 (10 microliter sample sizes).

Figure 11:
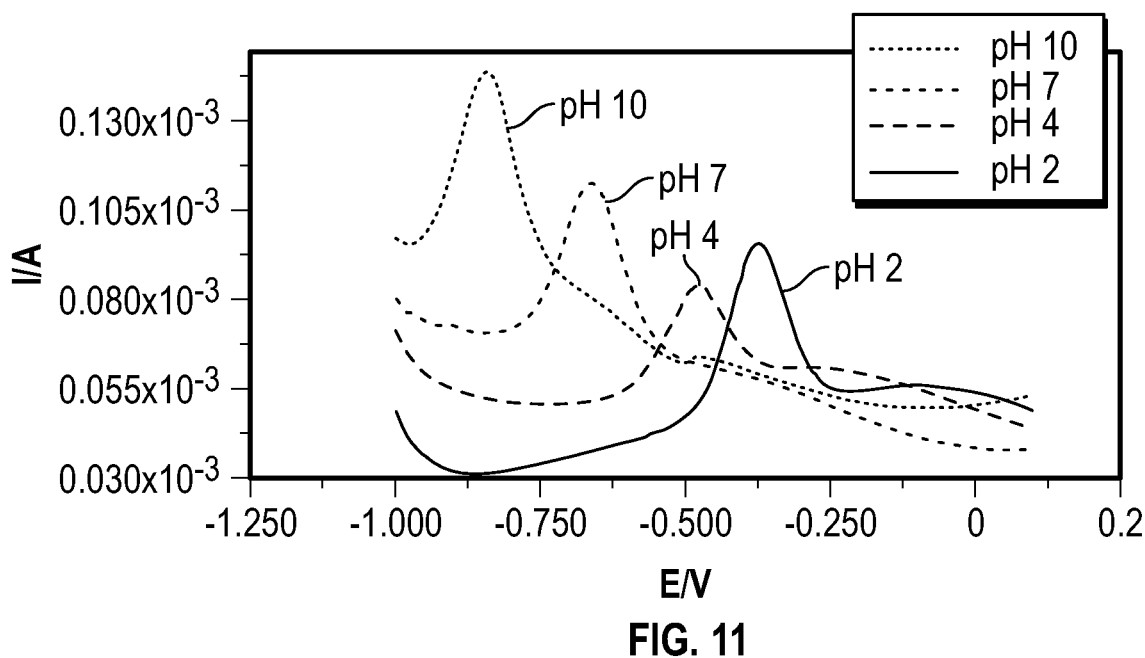
FIG. 11 shows a graph demonstrating square wave voltammetry plots for calibration data that was generated using electrode assemblies of the present invention with BDH Brand standards for pH 2, 4, 7, and 10.
Figure 12:
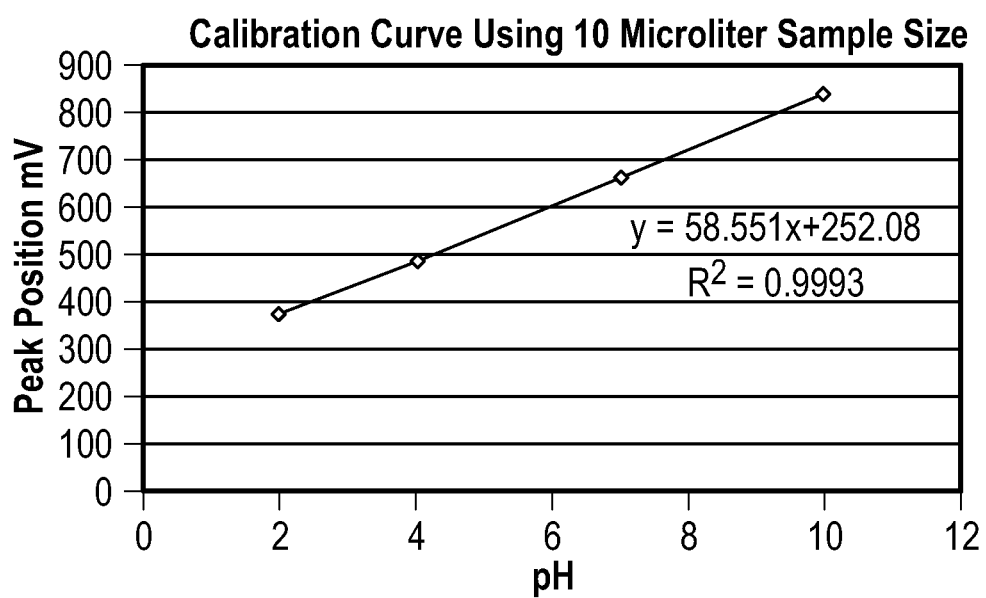
FIG. 12 shows a graph demonstrating peak data from FIG. 11 that was plotted versus pH buffer.

The peak data from FIG. 11 was plotted versus pH buffer to provide the results shown in FIG. 12. The plot demonstrates a linear relationship between pH and peak voltages from square wave voltammetry with 10 μL volume samples.

Figure 13:
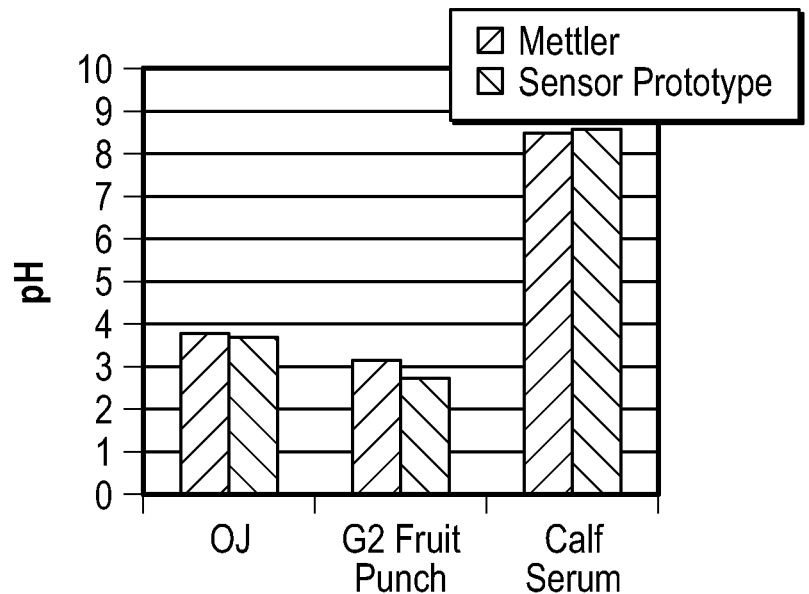
FIG. 13 shows a graph demonstrating the comparison of pH as measured by a pH sensor device of the instant invention and a commercially available pH meter.
Figure 14:
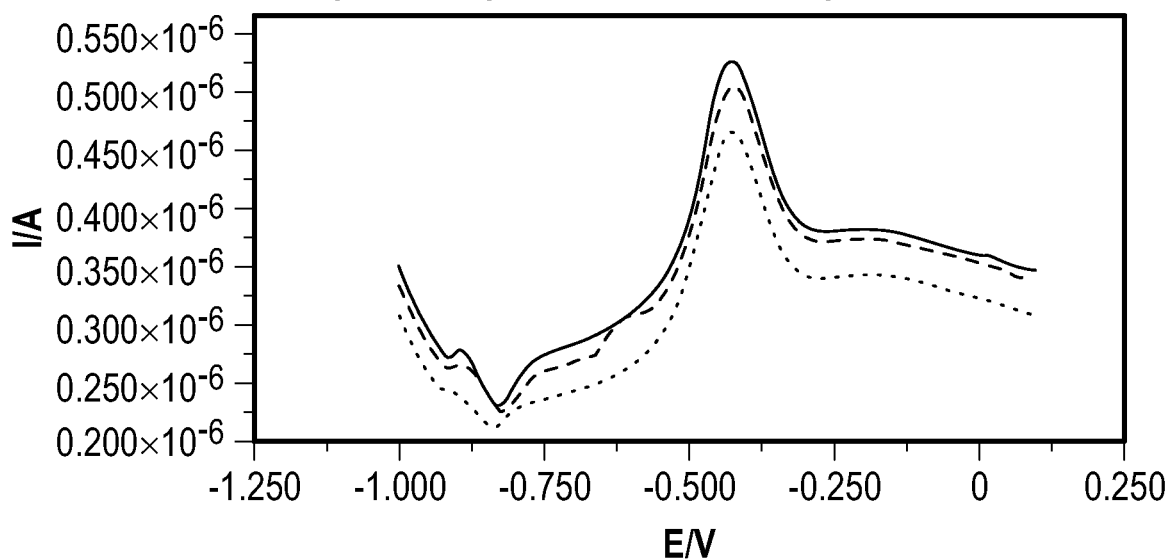
FIGS. 14-18 show graphs demonstrating overlaid plots of square wave voltammetry analysis for each buffer in FIG. 13.
Figure 15:
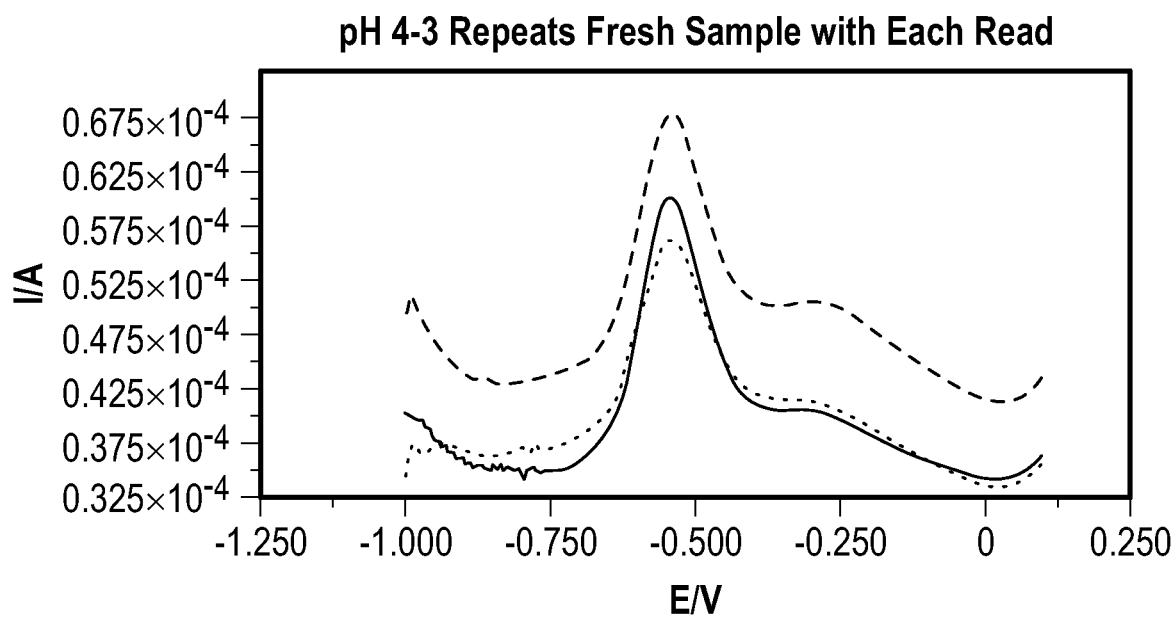
Figure 16:
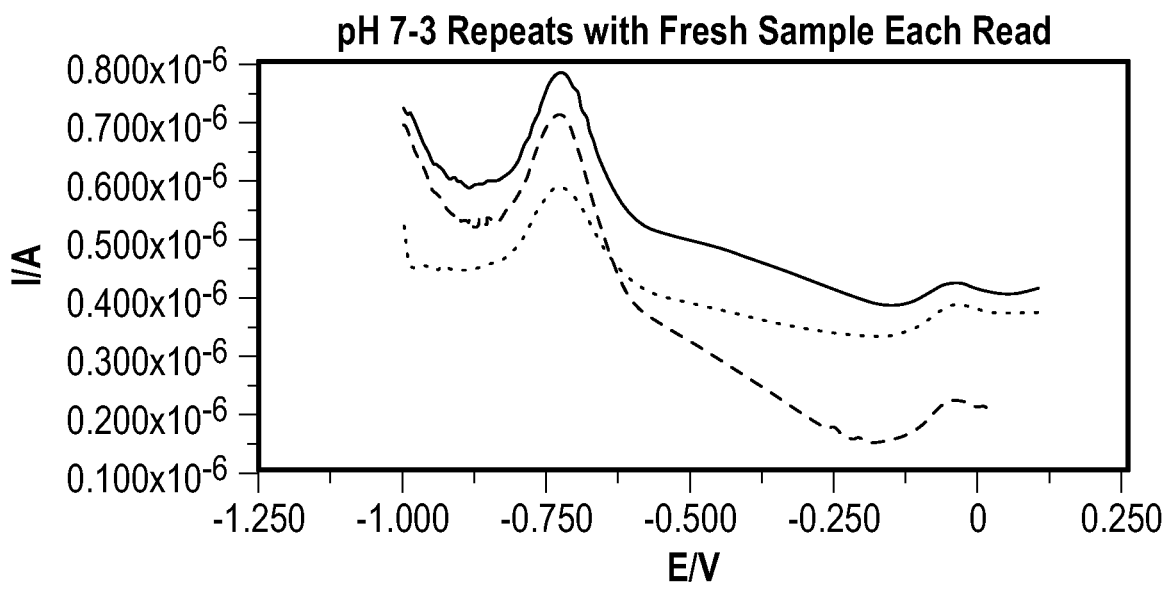
Figure 17:
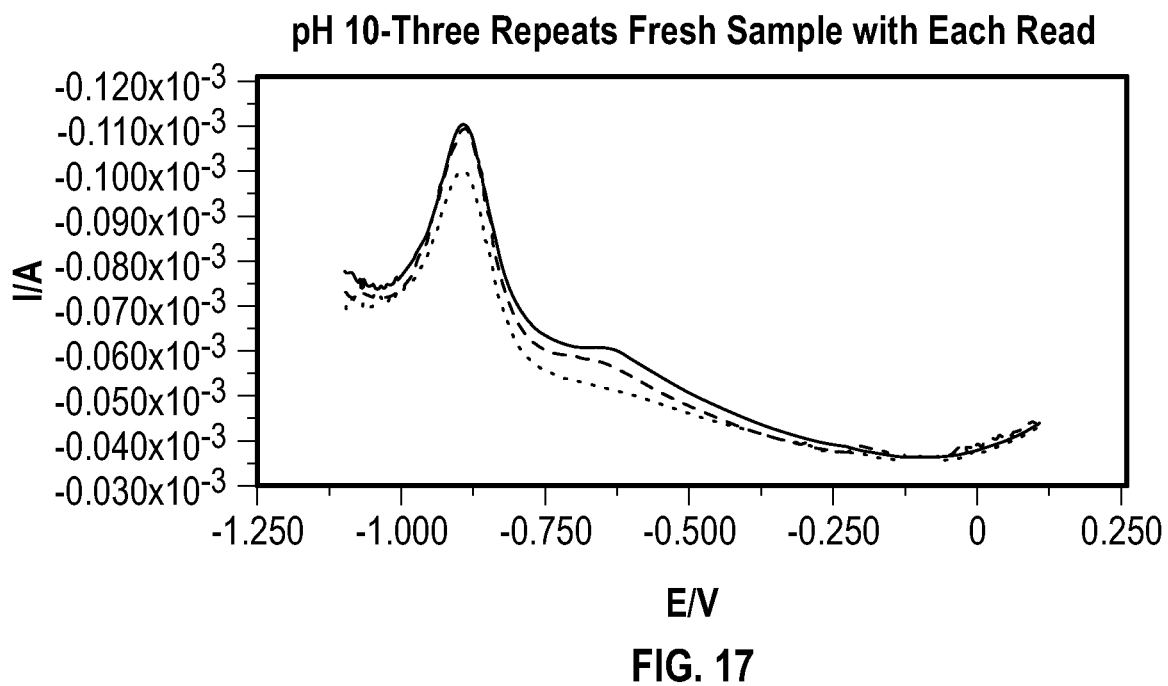
Figure 18:
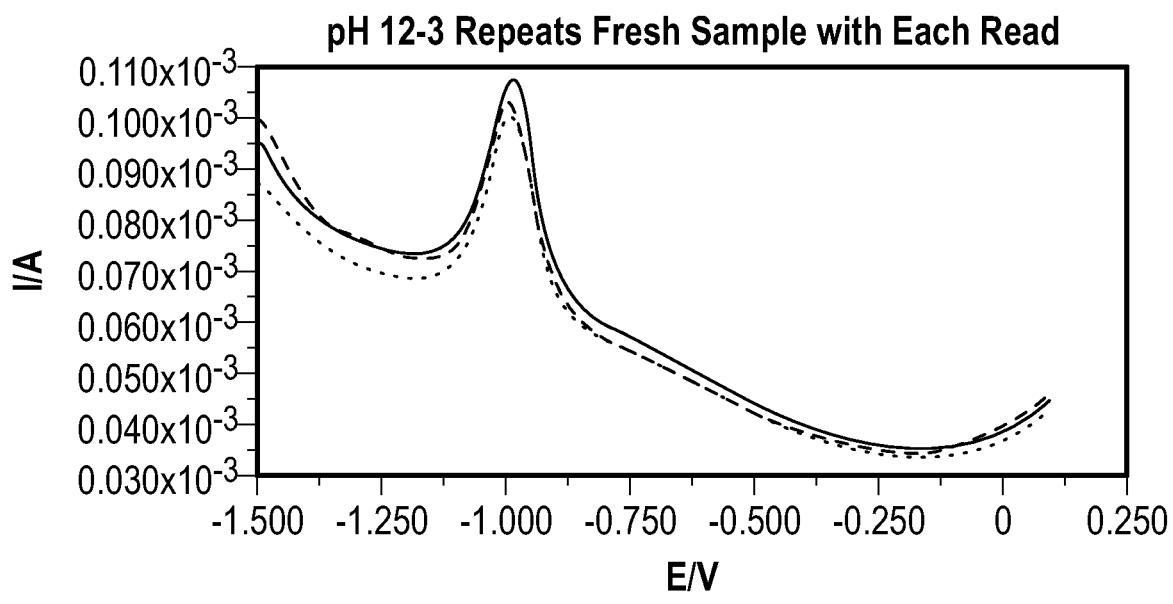

Three 10 microliter samples were tested for pH on the device and the results compared to a freshly calibrated Mettler Toledo Seven Easy™ meter using 10 mL samples. The samples were orange juice (OJ), calf serum, and G2 low calorie fruit punch. The comparative results are shown in FIG. 13.

Variability was evaluated taking three repeats each of BDH standards pH 2, pH 4, pH 7, pH 10, and pH 12. With each read of the sensor, a fresh 10 microliter sample of the buffer was used. Positioning of the sensor at each test point was accomplished with the help of a video camera. FIGS. 14-18 show overlaid plots of square wave voltammetry analysis for each buffer.

Figure 19:
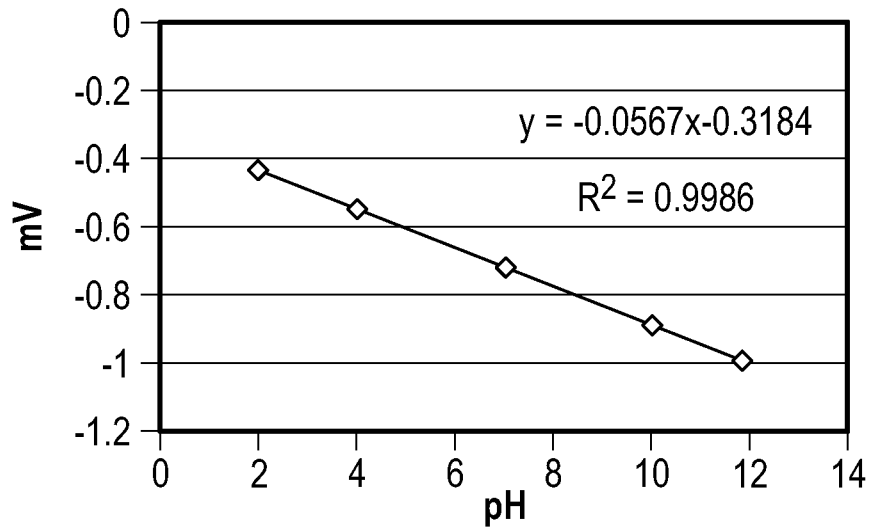
FIG. 19 shows a graph demonstrating peak data from FIGS. 14-18.

All data points from FIGS. 14-18 were plotted together, and are shown in FIG. 19 (showing individual data points, not averaged data). The data shows that peak voltage is linear and reproducible.

Figure 20:
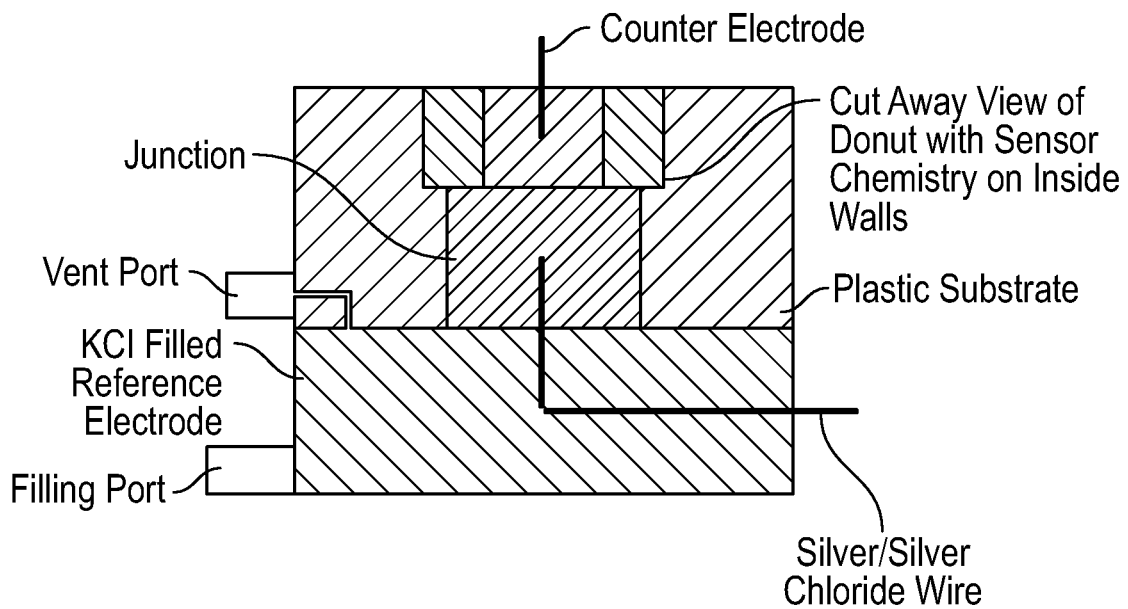
FIG. 20 shows a schematic view of a single well pH sensing device in accordance with a representative embodiment of the present invention.

Other embodiments of the miniaturized analyte sensors of the invention utilizes micro-wells for sample containment. In this embodiment, sample volume requirements are determined by the size of each well. In some embodiments, the sensor is shaped to conform to the walls of a well; the surface of these walls incorporates the redox active material that provides the sensor chemistry. The bottom of the well is formed, at least in part, by the reference electrode. A hydrophobic barrier is employed in some embodiments to facilitate containment of the sample in the well. The counter electrode is positioned in the well to complete the circuit (when sample is present). In some embodiments, the device is provided in a multi-well plate, enabling high throughput pH measurements optionally aided by robotics. This format is commonly used in diagnostic or other applications that require high throughput analysis. In some embodiments, a vent is employed to enable filling of the reference with salt solution to ensure that the reference junction has contact with the reference salt solution even though it is at or near the top surface of the reference solution chamber. Alternatively, a gel filled or solid state reference electrode is used in place of a liquid filled reference electrode. FIG. 20 illustrates a single well embodiment of this device, in accordance with a representative embodiment of the invention.

Fabrication of Sensors

Figure 21:
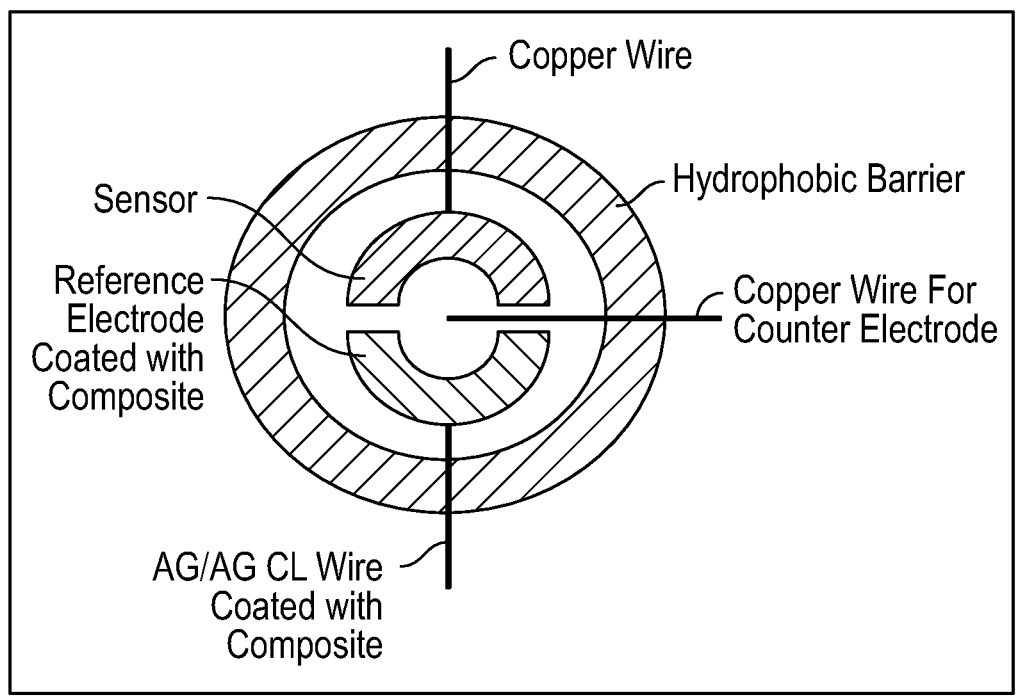
FIG. 21 shows a schematic view of a pH sensing device in accordance with a representative embodiment of the present invention.

A third embodiment of the miniaturized analyte sensors of the invention is produced by "printing" one or more of the reference, counter, and working electrodes onto a suitable substrate surface. The substrate may be in any shape. In various embodiments the substrate is an electrically conductive thin polymeric material or flexible substrate. In some embodiments, hydrophobic coating materials are utilized to delineate the sample application area. Thin flat circuits are constructed in a manner similar to that employed to make a electronic circuit boards. A composite composed of polyvinylidene fluoride (PVDF), a room temperature ionic fluid (RTIL), and a conductive material such as carbon is used in some embodiments to print or coat over a silver/silver chloride or other electrode material previously printed on the substrate to form the reference electrode. A conductive polymer or coating solution containing analyte-specific redox active material is printed onto the substrate in close proximity to the printed reference electrode to create the sensor surface. A third printed or otherwise attached electrode in close proximity serves as the counter electrode. The figure below shows some embodiments of this device. The size of the sensor (including the optional hydrophobic barrier) may be, for example and without limitation, about 2.5 millimeters in diameter. The design can be constructed with multiple sensors on the same substrate, including, but not limited to, a pattern that matches the multi-well layout of commercially available multi-well plates. An exemplary configuration of the sensor elements is shown in FIG. 21.

Fabrication methods for making other types of sensors can be readily adapted in view of the present disclosure to manufacture the electrodes and sensors of this invention. See, e.g., U.S. Pat. Nos. 5,676,820; 5,942,103; 6,063,259; 6,468,785; 6,878,255; and 6,893,552; PCT Publication WO 2011/031463; Windmiller et al., 2012, Chem. Comm. 48: 6794; Kagie et al., 2008, Electroanalysis 20: 1610; Chuang et al., 2010, Analyst 135: 1230; and Wang et al., 2005, Lab on a Chip 5: 226, each of which is incorporated herein by reference.

The present invention provides a variety of RAMs suitable for use in printing inks and coating formulations for sensor fabrication. The following examples describe the syntheses of such RAMS.

EXAMPLES

Example 1

A RAM suitable for use in printing inks and coating formulations for sensor fabrication was synthesized according to the equation provided in Formula I, as follows:

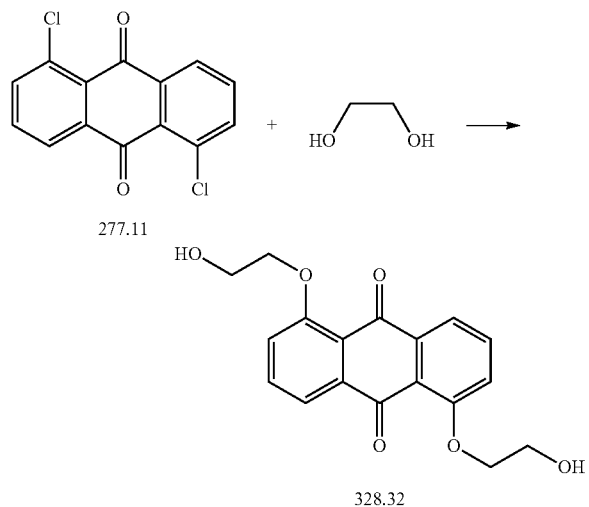

277.11

328.32

1,5-dichloroanthraquinone (20 gm, 0.072 moles) was stirred in ethylene glycol (300 mL). To this mixture was added potassium hydroxide pellets (11.8 gm, 85%, 0.179 moles). This reaction was stirred at 120° C. and after approximately 2 hours a dark red solution had formed. Heating was continued for an additional 16 hours. After cooling, the reaction mixture was added to water (800 mL) and this was left at room temperature overnight. The solid which had separated was isolated by filtration and dried. The dried solid was stirred overnight in diethyl ether (500 mL) which dissolved most of the un-reacted starting quinone. The insoluble material was isolated by filtration and dried to give 11.1 gm of crude product. The crude product was stirred in a mixture of methanol and methylene chloride (50 mL of 10% methanol in methylene chloride) and the insoluble material was isolated by filtration giving 4.4 gm of a solid. This was recrystallized twice from n-butanol to provide 2.0 gm (8.3%) of 1,5-bis-(2-hydroxyethyl)-anthraquinone as dark yellow needles.

Example 2

A RAM suitable for use in printing inks and coating formulations for sensor fabrication was synthesized according to the equation provided in Formula II, as follows:

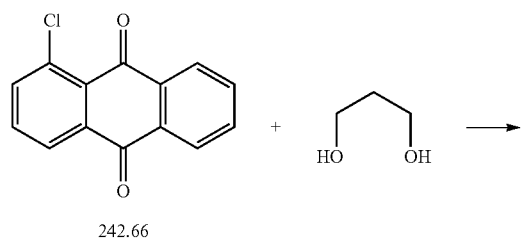

242.66

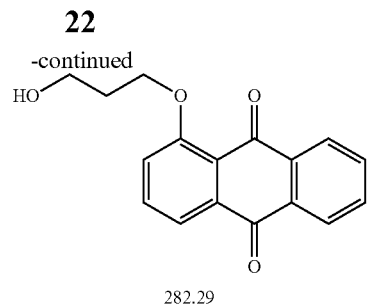

282.29

A mixture of 1-chloroanthraquinone (17.5 gm, 0.072 moles) and powdered potassium hydroxide (5.9 gm of 85%, 0.09 moles) was stirred in 1,3-propanediol (200 mL). This mixture was stirred at 120° C. for 24 hours. After cooling, the brown solution was poured into water (500 mL) and after settling overnight, the solids were isolated by filtration. The filter cake was washed with water and air dried. The dried solid was dissolved in methylene chloride (600 mL) and filtered free of insoluble material. The filtrates were dried over magnesium sulfate, filtered and then evaporated under reduced pressure to give a brown solid. A 5 gm sample of the crude, brown solid was dissolved in methylene chloride (20 mL) and this solution was placed on top of a silica column. Un-reacted 1-chloroanthraquinone was eluted using methylene chloride as eluent. The 1-(2-hydroxypropyl)anthraquinone was eluted by changing the solvent to 5% methanol in methylene chloride. The fractions containing the product were pooled and evaporated under reduced pressure to provide a solid. This was recrystallized from 2-propanol to provide 2.5 gm of 1-(2-hydroxypropyl)anthraquinone.

Example 3

A RAM suitable for use in printing inks and coating formulations for sensor fabrication was synthesized according to the equation provided in Formula III, as follows:

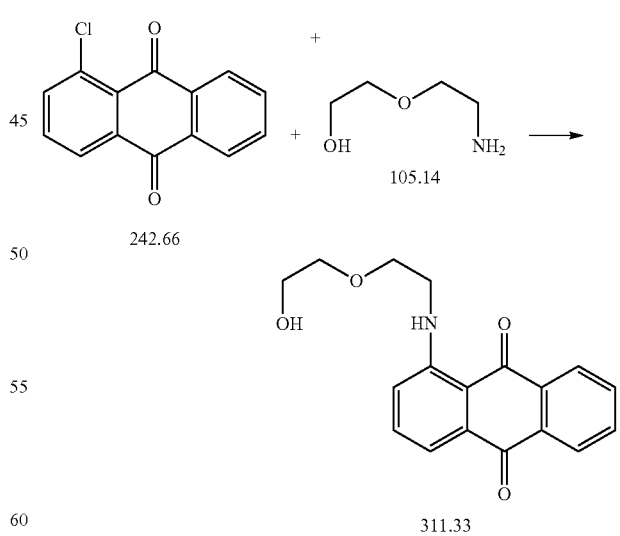

242.66

105.14

311.33

A mixture of 1-chloroanthraquinone (15 gm, 0.062 moles) and 2-(2-aminoethoxy)ethanol (105 gm 1.0 moles) was stirred at 90° C. for 16 hours. The hot solution was poured into water (500 mL) and the solids were isolated by filtration. The filter cake was washed with water and air dried.

The dried solid was recrystallized from 2-propanol (300 mL) to provide 14.0 gm of product as a red solid.

Example 4

A RAM suitable for use in printing inks and coating formulations for sensor fabrication was synthesized according to the equation provided in Formula IV, as follows:

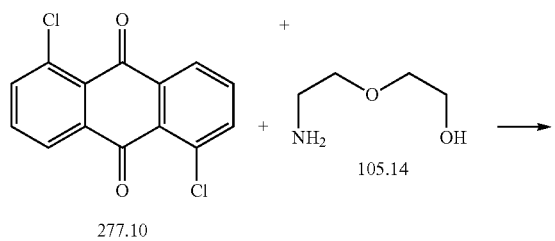

277.10

105.14

414.45

A mixture of 1,5-dichloroanthraquinone (15 gm, 0.054 moles) and 2-(2-aminoethoxy)ethanol (150 gm 1.43 moles) was stirred at 120° C. for 4 hours. The hot solution was poured into water (500 mL) containing concentrated hydrochloric acid (110 mL) and the solids which separated were isolated by filtration. The filter cake was washed with water and air dried. The dried solid was recrystallized from n-butanol (500 mL) to provide 19.8 gm of product as a purple solid.

Example 5

A RAM suitable for use in printing inks and coating formulations for sensor fabrication was synthesized according to the equation provided in Formula V, as follows:

242.66

75.11

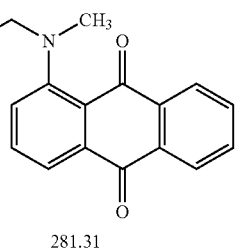

281.31

A mixture of 1-chloroanthraquinone (18 gm, 0.074 moles) and methylaminoethanol (155 gm 2.06 moles) was stirred at 120° C. for 5 hours. The hot solution was poured into water (700 mL) containing concentrated sulfuric acid (90 gm). After stirring for 15 minutes, the solids that separated were isolated by filtration. The filter cake was washed with water and air dried. The yield was 18 gm of product as a purple granular solid.

Example 6

A RAM suitable for use in printing inks and coating formulations for sensor fabrication was synthesized according to the equation provided in Formula VI, as follows:

277.10

75.11

353.41

A mixture of 1,5-dichloroanthraquinone (15 gm, 0.054 moles) and methylaminoethanol (150 gm 2.0 moles) was stirred at 120° C. for 4 hours. The cooled solution was poured into water (600 mL) containing concentrated sulfuric acid (85 gm). After stirring for 15 minutes, the solids that separated were isolated by filtration. The filter cake was washed with water and air dried. The yield was 18.5 gm of product as a purple solid.

Example 7

A RAM suitable for use in printing inks and coating formulations for sensor fabrication was synthesized according to the equation provided in Formula VII, as follows:

25

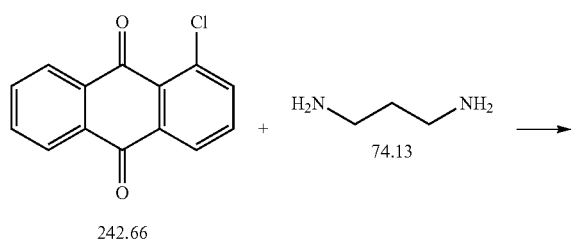

242.66      74.13

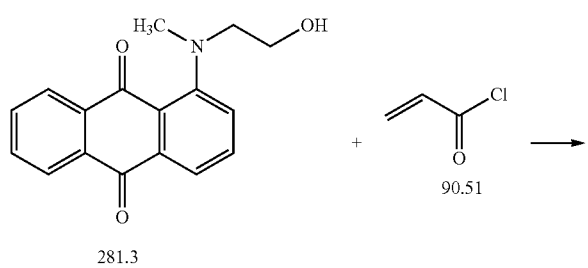

280.32

A mixture of 1-chloroanthraquinone (15 gm, 0.062 moles) and 1,3-diaminopropane (91.9 gm 1.24 moles) was stirred at 120° C. for 1 hour. The hot solution was cooled to room temperature causing the product to crystallize. The solid that crystallized was isolated by filtration. The filter cake was washed with water and air dried. The yield was 10.5 gm of product as a dark purple solid.

Example 8

A RAM suitable for use in printing inks and coating formulations for sensor fabrication was synthesized according to the equation provided in Formula VIII, as follows:

281.3        90.51

335.35

A solution of 1-(N-methyl-N-2-hydroxyethyl)aminoanthraaquinone (0.569 gm, $2.02 \times 10^{-3}$ moles) and diisopropylethylamine (0.261 gm, $2.02 \times 10^{-3}$ moles) in methylene chloride (50 mL) was stirred on ice as acryloyl chloride (0.200 gm, $2.2 \times 10^{-3}$ moles) in methylene chloride (5 mL) was slowly added. After the addition was complete the solution was stirred at room temperature overnight. The solution was washed with 5% sodium carbonate (50 mL) and was then dried over magnesium carbonate. After filtration, the methylene chloride was removed under reduced pressure to give the product in quantitative yield.

Example 9

A RAM suitable for use in printing inks and coating formulations for sensor fabrication was synthesized according to the equation provided in Formula IX, as follows:

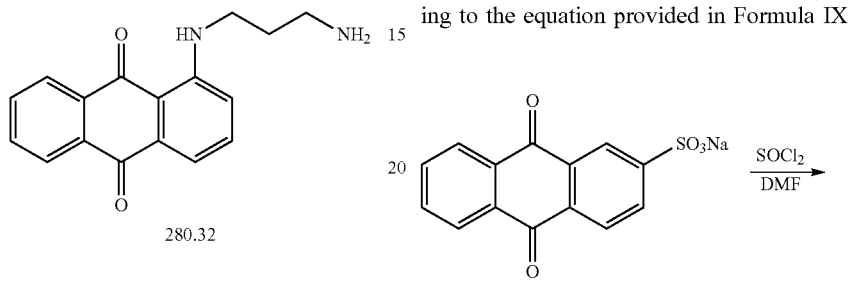

310.26

306.72

Sodium anthraquinone-2-sulfate hydrate (5.0 gm) was stirred in thionyl chloride (25 mL) as dimethyl formamide (1.0 mL) was added. The resulting mixture was heated at 70° C. for 2 hours to give a solution. After cooling the resulting thin slurry was poured onto ice with stirring until the thionyl chloride had been decomposed. The solid which separated was extracted into methylene chloride (300 mL). This solution was dried over magnesium sulfate. After filtration, the methylene chloride was removed under reduced pressure to provide the sulfonyl chloride as an off white granular solid in a yield of 4.5 gm.

Each of the RAMs in the above examples is used in conjunction with a coating material, such as a conductive ink, which contains functional groups reactive to the RAM. The coating material is combined with the RAM to achieve covalent attachment, and then the coating material is applied to a substrate with suitable electrical connections to deliver the signal generated by the RAM. Alternatively the conductive material is first coated onto the substrate and then reacted with the RAM. Other procedural combinations are used to achieve a variety of surface properties. In all cases the surface of the finished coating contains a concentration of the RAM determined by formulation, reaction conditions, and method of coating application.

The invention claimed is:
1. An electrochemical analyte sensor comprising a substrate coated with a functionalized anthraquinone moiety selected from the group consisting of:

Formula I)
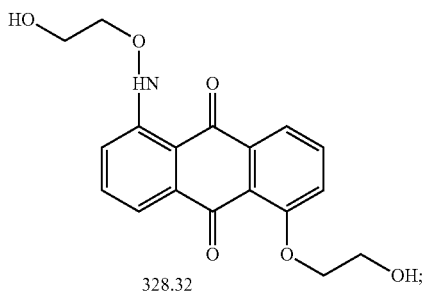
328.32

Formula IV)
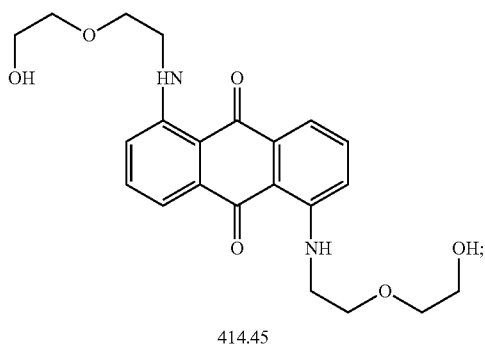
414.45

Formula V)
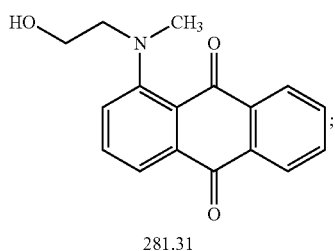
281.31

Formula VI)
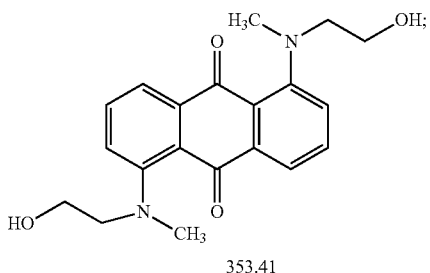
353.41

Formula VIII)
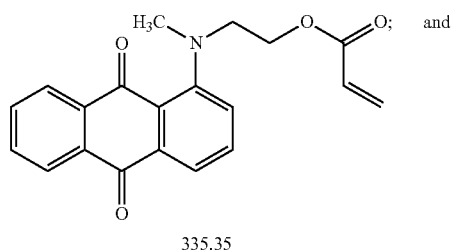
335.35

Formula IX)
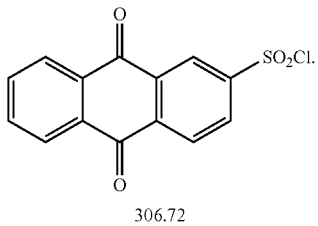
306.72

2. The electrochemical analyte sensor of claim 1, wherein the functionalized anthraquinone moiety is covalently bound to the substrate.

3. The electrochemical analyte sensor of claim 1, wherein the substrate is a working electrode comprising a polymeric material composed of polyvinyl alcohol and silica.

4. The electrochemical analyte sensor of claim 1, further comprising a reference electrode having a reference junction composed of a composite formed from an ionic liquid, a conductive material, and a polymer.

5. The electrochemical analyte sensor of claim 4, wherein the conductive material is a conductive solid matrix comprising the ionic liquid and a carbon allotrope, and wherein the ionic liquid is a room temperature ionic liquid.

6. The electrochemical analyte sensor of claim 5, wherein the room temperature ionic liquid is proton permeable.

7. The electrochemical analyte sensor of claim 5, wherein the carbon allotrope is electrically conductive.

8. A device, comprising:
an analyte sensor comprising a substrate coated with a functionalized anthraquinone moiety selected from the group consisting of:

Formula I)
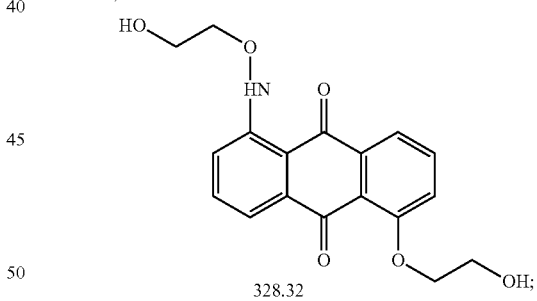
328.32

Formula IV)
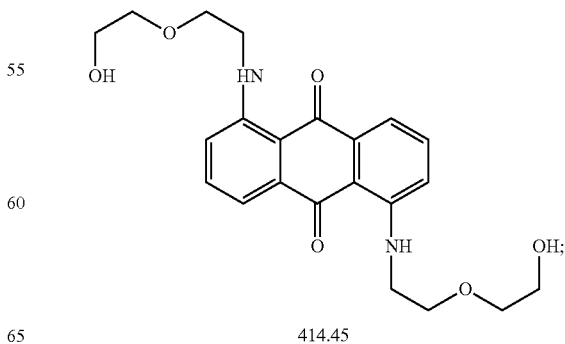
414.45

Formula V)

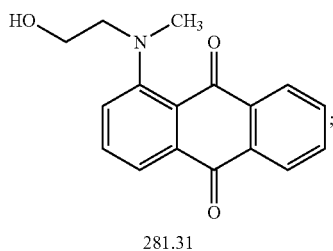

281.31

Formula VI)

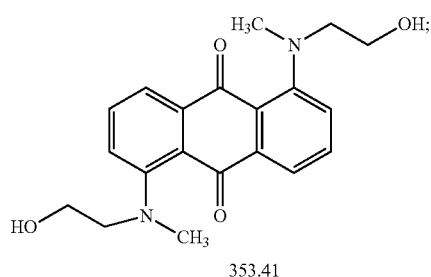

353.41

Formula VIII)

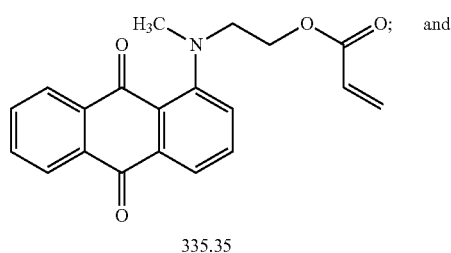

335.35

Formula IX)

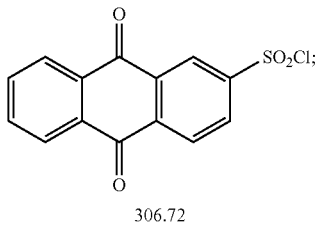

306.72 and at least one of an electrical contact point for applying electrical current, a controller unit, a processor unit, a program, an algorithm, and a probe for performing voltammetric scanning of the analyte sensor, wherein simultaneous analyte concentration measurements are made at the analyte sensor.

9. The device of claim 8, wherein the functionalized anthraquinone moiety is a redox active material.

10. The device of claim 8, wherein the substrate is a working electrode comprising a polymeric material composed of polyvinyl alcohol and silica.

11. The device of claim 8, wherein the analyte sensor comprises a reference electrode having a reference junction composed of a composite formed from an ionic liquid, a conductive material, and a polymer.

12. The device of claim 11, wherein the conductive material is a conductive solid matrix comprising the ionic liquid and a carbon allotrope, and wherein the ionic liquid is a room temperature ionic liquid.

13. The device of claim 12, wherein the room temperature ionic liquid is proton permeable.

14. The device of claim 12, wherein the carbon allotrope is electrically conductive.

* * * * *